(12) United States Patent
Dustin et al.

(10) Patent No.: US 12,291,601 B2
(45) Date of Patent: May 6, 2025

(54) CLOSED-LOOP THERMOPLASTIC COPOLYMERS

(71) Applicant: HRL Laboratories, LLC, Malibu, CA (US)

(72) Inventors: Ashley Dustin, Santa Monica, CA (US); Andrew Nowak, Los Angeles, CA (US); Erik Crenshaw, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 18/238,499

(22) Filed: Aug. 27, 2023

(65) Prior Publication Data
US 2025/0066551 A1 Feb. 27, 2025

(51) Int. Cl.
*C08G 73/02* (2006.01)
*C08J 11/12* (2006.01)
(Continued)

(52) U.S. Cl.
CPC ....... *C08G 73/0253* (2013.01); *C08G 73/024* (2013.01); *C08J 11/12* (2013.01); *C08J 11/16* (2013.01); *C08J 11/18* (2013.01)

(58) Field of Classification Search
CPC .... C08G 73/024; C08G 73/0253; C08J 11/12; C08J 11/16; C08J 11/18
See application file for complete search history.

(56) References Cited

U.S. PATENT DOCUMENTS 4,345,052 A    8/1982 Mumcu et al.
2020/0283415 A1*  9/2020 Helms ............. C07D 407/06

FOREIGN PATENT DOCUMENTS

WO    2022187451 A1    9/2022
WO    2023287509 A1    1/2023
WO    WO-2023212648 A2 * 11/2023

OTHER PUBLICATIONS

Wang, X. et al "The production of biobased diamines from renewable carbon sources: Current advances and perspectives". Chinese Journal of Chemical Engineering 30 (2021) 4-13 (Year: 2021).*

(Continued)

*Primary Examiner* — Christina H. W. Rosebach
(74) *Attorney, Agent, or Firm* — O'Connor & Company; Ryan P. O'Connor

(57) ABSTRACT

The disclosed technology provides a thermoplastic copolymer comprising: a plurality of difunctional triketone species; (b) a plurality of a first diamine species, wherein the first diamine species contains one or more primary amine groups and/or one or more secondary amine groups, and wherein the first diamine species does not contain a tertiary amine group; a plurality of a second diamine species, wherein the second diamine species contains one or more primary amine groups and/or one or more secondary amine groups, wherein the second diamine species does not contain a tertiary amine group, and wherein the second diamine species is different than the first diamine species; and optionally, a plurality of monofunctional amine-reactive groups. Some embodiments provide segmented thermoplastic copolymers. Methods of making and using the thermoplastic copolymer are also described, including depolymerizing the thermoplastic copolymer to form recycled monomers. The recycled monomers may then be repolymerized in a closed-loop system.

13 Claims, 13 Drawing Sheets

(51) Int. Cl.
*C08J 11/16* (2006.01)
*C08J 11/18* (2006.01)

(56) References Cited

OTHER PUBLICATIONS

He et al., "Conformational Entropy as a Means to Control the Behavior of Poly(diketoenamine) Vitrimers In and Out of Equilibrium", Angew. Chem. Int. Ed. 2020, 59, 735-739.
Christensen et al., "Closed-Loop Recycling of Plastics Enabled by Dynamic Covalent Diketoenamine Bonds", Nature chemistry, 11(5), May 1, 2019, DOI: 10.1038/s41557-019-0249-2, with Supplementary Information.
Winne et al., "Dynamic covalent chemistry in polymer networks: a mechanistic perspective", Polymer Chemistry vol. 10, Issue 45, Dec. 2019, pp. 6091-6108.
Dugas et al., "Diketoenamine-Based Vitrimers via Thiol-ene Photopolymerization", Macromol. Rapid Commun. 2022, 43, 2200249.
Demarteau et al., "Circularity in mixed-plastic chemical recycling enabled by variable rates of polydiketoenamine hydrolysis", Science Advances 8, eabp8823 (2022), with Supplementary Information.
Leone et al., "Dynamically Cross-Linked Polyolefins via Hydrogen Bonds: Tough yet Soft Thermoplastic Elastomers with High Elastic Recovery",ACS Appl. Polym. Mater., 2022, 4, 5; abstract.
Altuna et al., "Epoxy vitrimers incorporating physical crosslinks produced by self-association of alkyl chains", Polymer Chemistry 11, 7 (2020); abstract.
Written Opinion of the International Search Authority, PCT/US2023/031227, dated May 17, 2024.
Written Opinion of the International Search Authority, PCT/US2023/029919, dated May 1, 2024.

\* cited by examiner

| Molar Composition m-BAPS:D-400:Triketone | $T_g$ (°C) | $T_{d5\%}$ (°C) |
|---|---|---|
| 0:100:1 | −25.8 | ND |
| 0.25:0.75:1 | 0.2 | 324.1 |
| 0.5:0.5:1 | 20.9 | 304.0 |
| 0.75:0.25:1 | 57.1 | ND |

FIG. 4

| Molar Composition m-BAPS:D-400:Triketone | $T_g$ (°C) |
|---|---|
| 0:100:1 | −6.4 |
| 0.25:0.75:1 | 14.0 |
| 0.5:0.5:1 | 29.0 |
| 0.75:0.25:1 | 59.2 |
| 100:0:1 | 75.5 |

FIG. 6

CLOSED-LOOP THERMOPLASTIC COPOLYMERS

FIELD OF THE INVENTION

The present invention generally relates to repairable thermoplastic polymers, and methods of making and using the same.

BACKGROUND OF THE INVENTION

A thermoplastic is a polymer material that becomes pliable or moldable at elevated temperatures and solidifies upon cooling. Thermoplastic polymers with distinct rigid and flexible portions allow for micro-scale organization of polymer chains, potentially improving the physical robustness of the bulk material. Variation of monomer compositions can tune the stress and strain at break for the desired end use application, as well as tune physical properties to optimize processing.

Traditional thermoplastics do not incorporate dynamic bonds, preventing recovery or facile repair of material properties after damage has occurred at the molecular level of the thermoplastic polymer. There is literature on the use of dynamic polymer bonds in vitrimers, but vitrimeric polymers are very different from thermoplastic polymers.

Current thermoplastic materials are also typically unable to be depolymerized back to monomers. While there are chemical pathways utilizing heat, solvents, and catalysts to break down the polymers, these pathways conventionally suffer from low selectivity to monomer and the difficulty in removing the depolymerization catalyst from the recycled monomer. This constraint greatly limits the recyclability, especially in the context of filled and pigmented plastics which are commonly recycled.

There is a desire for copolymers and/or segmented polymer systems that demonstrate depolymerization specificity and tunability, to enable widespread use across a variety of environmental conditions.

SUMMARY OF THE INVENTION

The present invention addresses the aforementioned needs in the art, as will now be summarized and then further described in detail below.

The disclosed technology provides a thermoplastic copolymer comprising:
(a) a plurality of difunctional triketone species, or a reacted form thereof;
(b) a plurality of a first diamine species, or a reacted form thereof, wherein the first diamine species contains one or more primary amine groups and/or one or more secondary amine groups, and wherein the first diamine species does not contain a tertiary amine group;
(c) a plurality of a second diamine species, or a reacted form thereof, wherein the second diamine species contains one or more primary amine groups and/or one or more secondary amine groups, wherein the second diamine species does not contain a tertiary amine group, and wherein the second diamine species is different than the first diamine species; and
(d) optionally, a plurality of monofunctional amine-reactive groups, or a reacted form thereof.

In some embodiments, the difunctional triketone species contains a polyether. The polyether may be selected from the group consisting of polyethylene glycol, polypropylene glycol, polytetrahydrofuran, polypropanediols, perfluoropolyethers, siloxanes, and combinations thereof, for example.

In some embodiments, the difunctional triketone species is a difunctional triketone monomer having the structure:

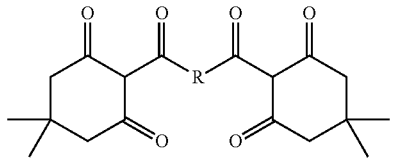

wherein R contains from 1 to 50 carbon atoms;
wherein R is a linear hydrocarbon group, a branched hydrocarbon group, a cyclic hydrocarbon group, or a combination thereof; and
wherein R contains carbon-carbon single bonds, carbon-carbon aromatic bonds, carbon-carbon double bonds, carbon-carbon triple bonds, or a combination thereof.

In some embodiments, R is a linear hydrocarbon group, and wherein R contains from 4 to 12 carbon atoms.

In some embodiments, R is selected from benzene, naphthalene, or anthracene.

In some embodiments, the first diamine species and the second diamine species are independently selected from the group consisting of an aliphatic diamine, an aromatic diamine, an ether diamine, and combinations thereof.

An aliphatic diamine may be selected from the group consisting of ethylene diamine, 1,2-diaminopropane, 1,3-diaminopropane, 1,2-cyclohexanediamine, 1,3-cyclohexanediamine, 1,4-cyclohexanediamine, and combinations thereof, for example.

An aromatic diamine is selected from the group consisting of bis[4-(3-aminophenoxy)phenyl]sulfone, poly(bis[4-(3-aminophenoxy)phenyl]sulfone), bis[4-(4-aminophenoxy)phenyl]sulfone, poly(bis[4-(4-aminophenoxy)phenyl]sulfone), benzene diamines, anthracene diamines, naphthalene diamines, 4,4'-diaminodiphenylmethane, 2,3-diaminophenol, 4,4'-oxydianiline, and combinations thereof, for example.

An ether diamine may be selected from the group consisting of polyethylene glycol diamine, polypropylene glycol diamine, polytetrahydrofuran diamine, polypropanediol diamines, perfluoropolyether diamines, siloxane diamines, 4,4'-oxydianiline, and combinations thereof, for example. In some embodiments, the ether diamine has a molecular weight selected from about 100 g/mol to about 10000 g/mol, such as about 200-5000 g/mol or about 200-2000 g/mol.

In some embodiments, the monofunctional amine-reactive groups are present. The monofunctional amine-reactive groups may be selected from the group consisting of epoxy, oxalate, and isocyanate, for example.

The thermoplastic copolymer may further contain one or more additives (e.g., pigments) or fillers (e.g., clays).

The thermoplastic copolymer may be characterized by a glass-transition temperature $T_g$ from about $-100°$ C. to about $200°$ C., such as from about $-30°$ C. to about $100°$ C., for example.

In some embodiments, the thermoplastic copolymer is a segmented thermoplastic copolymer.

Some variations of the invention provide a method of making a thermoplastic copolymer, the method comprising:
(a) obtaining a difunctional triketone compound;
(b) obtaining a first diamine compound;
(c) obtaining a second diamine compound;

(d) optionally, obtaining a monofunctional amine-reactive compound;
(e) optionally, obtaining one or more additives or fillers;
(f) mixing the difunctional triketone compound with the first diamine compound, with the second diamine compound, with the amine-reactive compound if present, and with the additives or fillers if present, thereby forming a polymer precursor mixture;
(g) heating the polymer precursor mixture to cause reaction of the polymer precursor mixture, thereby forming a thermoplastic copolymer; and
(h) applying the thermoplastic copolymer and/or the polymer precursor mixture onto a substrate.

In some embodiments, the difunctional triketone compound is a recycled compound. The recycled difunctional triketone compound may be recycled polymer, recycled oligomer, recycled monomer, or a combination thereof. The recycled material may include a ketoenamine compound, or another material that still contains ketoenamine groups which did not convert back to triketone groups.

In some methods, the difunctional triketone species contains a polyether. The polyether may be selected from the group consisting of polyethylene glycol, polypropylene glycol, polytetrahydrofuran, polypropanediols, perfluoropolyethers, siloxanes, and combinations thereof, for example.

In some methods, the difunctional triketone compound has the structure:

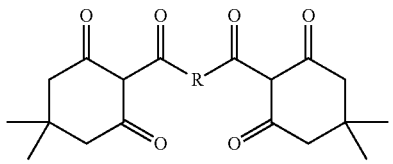

wherein R contains from 1 to 50 carbon atoms;
wherein R is a linear hydrocarbon group, a branched hydrocarbon group, a cyclic hydrocarbon group, or a combination thereof; and
wherein R contains carbon-carbon single bonds, carbon-carbon aromatic bonds, carbon-carbon double bonds, carbon-carbon triple bonds, or a combination thereof.

R may be a linear hydrocarbon group, such as one containing from 4 to 12 carbon atoms. R may be a linear aromatic group, such as one containing from 6 to 24 carbon atoms. In certain embodiments, R is selected from benzene, naphthalene, or anthracene.

In some methods, the first diamine species and the second diamine species are independently selected from the group consisting of an aliphatic diamine, an aromatic diamine, an ether diamine, and combinations thereof.

An aliphatic diamine may be selected from the group consisting of ethylene diamine, 1,2-diaminopropane, 1,3-diaminopropane, 1,2-cyclohexanediamine, 1,3-cyclohexanediamine, 1,4-cyclohexanediamine, and combinations thereof, for example.

An aromatic diamine may be selected from the group consisting of bis[4-(3-aminophenoxy)phenyl]sulfone, poly(bis[4-(3-aminophenoxy)phenyl]sulfone), bis[4-(4-aminophenoxy)phenyl]sulfone, poly(bis[4-(4-aminophenoxy)phenyl]sulfone), benzene diamines, anthracene diamines, naphthalene diamines, 4,4'-diaminodiphenylmethane, 2,3-diaminophenol, 4,4'-oxydianiline, and combinations thereof, for example.

An ether diamine may be selected from the group consisting of polyethylene glycol diamine, polypropylene glycol diamine, polytetrahydrofuran diamine, polypropanediol diamines, perfluoropolyether diamines, siloxane diamines, 4,4'-oxydianiline, and combinations thereof, for example.

In some methods, step (d) is performed. The monofunctional amine-reactive compounds may be selected from the group consisting of epoxies, oxalates, and isocyanates, for example.

In some methods, step (e) is performed. Many additives or fillers are possible, including but not limited to pigments and clays.

A diketoenamine-containing compound may be mixed with the other components in step (f). The diketoenamine-containing compound already contains diketoenamine groups and does not need to undergo triketone-to-diketoenamine conversion during polymer synthesis (e.g., in step (g)). The diketoenamine-containing compound may be added as a distinct species from the other components, or the diketoenamine-containing compound may be in mixed form with the difunctional triketone compound, such as in a recycled material that contains some functional triketone groups as well as some functional ketoenamine groups.

In some methods, step (f) utilizes a solvent for forming the polymer precursor mixture. In certain methods, step (h) utilizes dissolving (in the solvent) and then spraying (e.g., spray coating) the thermoplastic polymer onto the substrate. In certain methods, step (h) utilizes solution casting the thermoplastic polymer onto the substrate. In solution casting, the thermoplastic polymer is dissolved in a solvent, forming a solution.

In some methods, step (h) utilizes injection molding the thermoplastic polymer onto the substrate. Injection molding may utilize a solvent, or may instead use neat polymer without a solvent.

In some methods, step (h) utilizes thermoforming the thermoplastic polymer onto the substrate. Thermoforming may utilize a solvent, or may instead use neat polymer without a solvent.

Steps (g) and (h) may be carried out simultaneously, applying the thermoplastic copolymer onto the substrate as the thermoplastic copolymer is being formed. These embodiments may utilize a solvent, or may instead use melt polymerization without a solvent.

The method may further comprise depolymerizing the thermoplastic copolymer, thereby generating recycled thermoplastic monomers.

In some methods, depolymerizing is carried out using exposure of the thermoplastic copolymer to an aqueous acid. An aqueous acid may be selected from hydrochloric acid, sulfuric acid, or a combination thereof, for example.

In some methods, depolymerizing is carried out using exposure of the thermoplastic copolymer to an organic solvent. An organic solvent may be selected from the group consisting of tetrahydrofuran, methyl ethyl ketone, methyl propyl ketone, methyl isobutyl ketone, acetone, diethyl ether, n-butyl acetate, toluene, benzene, xylenes, hexanes, methylene chloride, and combinations thereof, for example.

In some methods, depolymerizing is carried out using exposure of the thermoplastic copolymer to an elevated temperature, such as a temperature selected from about 30° C. to about 200° C., or from about 40° C. to about 100° C., or from about 40° C. to about 70° C.

In some methods, depolymerizing is carried out using exposure of the thermoplastic copolymer to an aqueous acid as well as to an organic solvent.

In some methods, depolymerizing is carried out using exposure of the thermoplastic copolymer to an aqueous acid as well as to an elevated temperature.

In some methods, depolymerizing is carried out using exposure of the thermoplastic copolymer to an organic solvent as well as to an elevated temperature.

In certain methods, depolymerizing is carried out using exposure of the thermoplastic copolymer to an aqueous acid, an organic solvent, and an elevated temperature.

In preferred embodiments, recycled thermoplastic monomers form at least part of the difunctional triketone compound, the first diamine compound, and/or the second diamine compound. Steps (a) to (h) may be repeated multiple times in a closed loop.

It is possible to make the thermoplastic copolymer and then apply it to a substrate in heated form, such as above the $T_g$ of the thermoplastic copolymer. In some embodiments, a method of making a thermoplastic copolymer comprises:

(a) obtaining a difunctional triketone compound;
(b) obtaining a first diamine compound;
(c) obtaining a second diamine compound;
(d) optionally, obtaining a monofunctional amine-reactive compound;
(e) optionally, obtaining one or more additives or fillers;
(f) mixing the difunctional triketone compound with the first diamine compound, with the second diamine compound, with the amine-reactive compound if present, and with the additives or fillers if present, thereby forming a polymer precursor mixture;
(g) heating the polymer precursor mixture to cause reaction of the polymer precursor mixture, thereby forming a thermoplastic copolymer; and
(h) applying the thermoplastic copolymer onto a substrate.

Other variations of the invention provide a method of making a segmented thermoplastic copolymer, the method comprising:

(a) obtaining a difunctional triketone compound;
(b) obtaining a first diamine compound;
(c) obtaining a second diamine compound;
(d) optionally, obtaining a monofunctional amine-reactive compound;
(e) optionally, obtaining one or more additives or fillers;
(f) mixing the difunctional triketone compound with the first diamine compound and with the amine-reactive compound if present, thereby forming a first polymer precursor mixture;
(g) heating the first polymer precursor mixture for a first period of time;
(h) mixing the first polymer precursor mixture with the second diamine compound and with the additives or fillers if present, thereby forming a second polymer precursor mixture;
(i) heating the second polymer precursor mixture for a second period of time and reacting the second polymer precursor mixture to form a segmented thermoplastic copolymer; and
(j) applying the segmented thermoplastic copolymer onto a substrate.

In some methods of making a segmented thermoplastic copolymer, the difunctional triketone compound is a recycled compound. The recycled difunctional triketone compound may be recycled polymer, recycled oligomer, recycled monomer, or a combination thereof. The recycled material may include a ketoenamine compound, or another material that still contains ketoenamine groups which did not convert to triketone groups.

In some methods of making a segmented thermoplastic copolymer, the difunctional triketone species contains a polyether. The polyether may be selected from the group consisting of polyethylene glycol, polypropylene glycol, polytetrahydrofuran, polypropanediols, perfluoropolyethers, siloxanes, and combinations thereof, for example.

In some methods of making a segmented thermoplastic copolymer, the difunctional triketone compound has the structure:

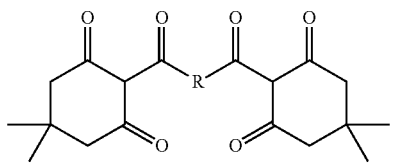

wherein R contains from 1 to 50 carbon atoms;
wherein R is a linear hydrocarbon group, a branched hydrocarbon group, a cyclic hydrocarbon group, or a combination thereof; and
wherein R contains carbon-carbon single bonds, carbon-carbon aromatic bonds, carbon-carbon double bonds, carbon-carbon triple bonds, or a combination thereof.

In some methods of making a segmented thermoplastic copolymer, R is a linear hydrocarbon group, such as a linear hydrocarbon group containing from 4 to 12 carbon atoms. In some methods, R is selected from benzene, naphthalene, or anthracene.

In some methods of making a segmented thermoplastic copolymer, the first diamine species and the second diamine species are independently selected from the group consisting of an aliphatic diamine, an aromatic diamine, an ether diamine, and combinations thereof.

An aliphatic diamine may be selected from the group consisting of ethylene diamine, 1,2-diaminopropane, 1,3-diaminopropane, 1,2-cyclohexanediamine, 1,3-cyclohexanediamine, 1,4-cyclohexanediamine, and combinations thereof, for example.

An aromatic diamine may be selected from the group consisting of bis[4-(3-aminophenoxy)phenyl]sulfone, poly(bis[4-(3-aminophenoxy)phenyl]sulfone), bis[4-(4-aminophenoxy)phenyl]sulfone, poly(bis[4-(4-aminophenoxy)phenyl]sulfone), benzene diamines, anthracene diamines, naphthalene diamines, 4,4'-diaminodiphenylmethane, 2,3-diaminophenol, 4,4'-oxydianiline, and combinations thereof, for example.

An ether diamine may be selected from the group consisting of polyethylene glycol diamine, polypropylene glycol diamine, polytetrahydrofuran diamine, polypropanediol diamines, perfluoropolyether diamines, siloxane diamines, 4,4'-oxydianiline, and combinations thereof, for example.

In some methods of making a segmented thermoplastic copolymer, step (d) is performed. The monofunctional amine-reactive compounds may be selected from the group consisting of epoxies, oxalates, and isocyanates, for example.

In some methods of making a segmented thermoplastic copolymer, step (e) is performed. Many additives or fillers are possible, including but not limited to pigments and clays.

A diketoenamine-containing compound may be mixed with the other components in step (f) and/or in step (h). The diketoenamine-containing compound already contains diketoenamine groups and does not need to undergo triketone-to-diketoenamine conversion during polymer synthesis (e.g., in step (i)). The diketoenamine-containing compound may be added as a distinct species from the other components, or the diketoenamine-containing compound may be in mixed form with the difunctional triketone compound, such as in a recycled material that contains some functional triketone groups as well as some functional ketoenamine groups.

In some methods of making a segmented thermoplastic copolymer, step (f) utilizes a solvent for forming the first polymer precursor mixture.

In some methods of making a segmented thermoplastic copolymer, step (j) utilizes spraying the second polymer precursor mixture onto the substrate.

In some methods of making a segmented thermoplastic copolymer, step (j) utilizes casting the second polymer precursor mixture onto the substrate.

The method may further comprise depolymerizing the segmented thermoplastic copolymer, thereby generating recycled thermoplastic monomers.

In some methods of making (and using) a segmented thermoplastic copolymer, depolymerizing is carried out using exposure of the segmented thermoplastic copolymer to an aqueous acid, such as hydrochloric acid, sulfuric acid, or a combination thereof.

In some methods of making (and using) a segmented thermoplastic copolymer, depolymerizing is carried out using exposure of the segmented thermoplastic copolymer to an organic solvent. The organic solvent may be selected from the group consisting of tetrahydrofuran, methyl ethyl ketone, methyl propyl ketone, methyl isobutyl ketone, acetone, diethyl ether, n-butyl acetate, toluene, benzene, xylenes, hexanes, methylene chloride, and combinations thereof, for example.

In some methods of making (and using) a segmented thermoplastic copolymer, depolymerizing is carried out using exposure of the segmented thermoplastic copolymer to an elevated temperature selected from about 30° C. to about 200° C., for example.

In some methods of making (and using) a segmented thermoplastic copolymer, depolymerizing is carried out using exposure of the segmented thermoplastic copolymer to an aqueous acid as well as to an organic solvent.

In some methods of making (and using) a segmented thermoplastic copolymer, depolymerizing is carried out using exposure of the segmented thermoplastic copolymer to an aqueous acid as well as to an elevated temperature.

In some methods of making (and using) a segmented thermoplastic copolymer, depolymerizing is carried out using exposure of the segmented thermoplastic copolymer to an organic solvent as well as to an elevated temperature.

In certain methods of making (and using) a segmented thermoplastic copolymer, depolymerizing is carried out using exposure of the segmented thermoplastic copolymer to an aqueous acid, an organic solvent, and an elevated temperature.

In some methods of making (and using) a segmented thermoplastic copolymer, the recycled thermoplastic monomers form at least part of the difunctional triketone compound, the first diamine compound, and/or the second diamine compound. Steps (a) to (j) may be repeated multiple times in a closed loop.

It is possible to make the segmented thermoplastic copolymer and then apply it to a substrate in heated form, such as above the $T_g$ of the segmented thermoplastic copolymer. In some embodiments, a method of making a segmented thermoplastic copolymer comprises:

(a) obtaining a difunctional triketone compound;
(b) obtaining a first diamine compound;
(c) obtaining a second diamine compound;
(d) optionally, obtaining a monofunctional amine-reactive compound;
(e) optionally, obtaining one or more additives or fillers;
(f) mixing the difunctional triketone compound with the first diamine compound and with the amine-reactive compound if present, thereby forming a first polymer precursor mixture;
(g) heating the first polymer precursor mixture for a first period of time;
(h) mixing the first polymer precursor mixture with the second diamine compound and with the additives or fillers if present, thereby forming a second polymer precursor mixture;
(i) heating the second polymer precursor mixture for a second period of time;
(j) reacting the second polymer precursor mixture to form a segmented thermoplastic copolymer; and
(k) applying the segmented thermoplastic copolymer onto a substrate.

BRIEF DESCRIPTION OF THE FIGURES

FIG. 4 summarizes thermal analysis data for four distinct poly(diketoenamine) films using amines ranging from 100% D-400 polyetheramine to 25% D-400 polyetheramine/75% m-BAPS, in Example 7.

FIG. 6 summarizes thermal analysis data for four distinct poly(diketoenamine) films using amines ranging from 100% D-400 polyetheramine to 25% D-400 polyetheramine/75% m-BAPS, in Example 6.

DETAILED DESCRIPTION OF EMBODIMENTS OF THE INVENTION

Figure 1:
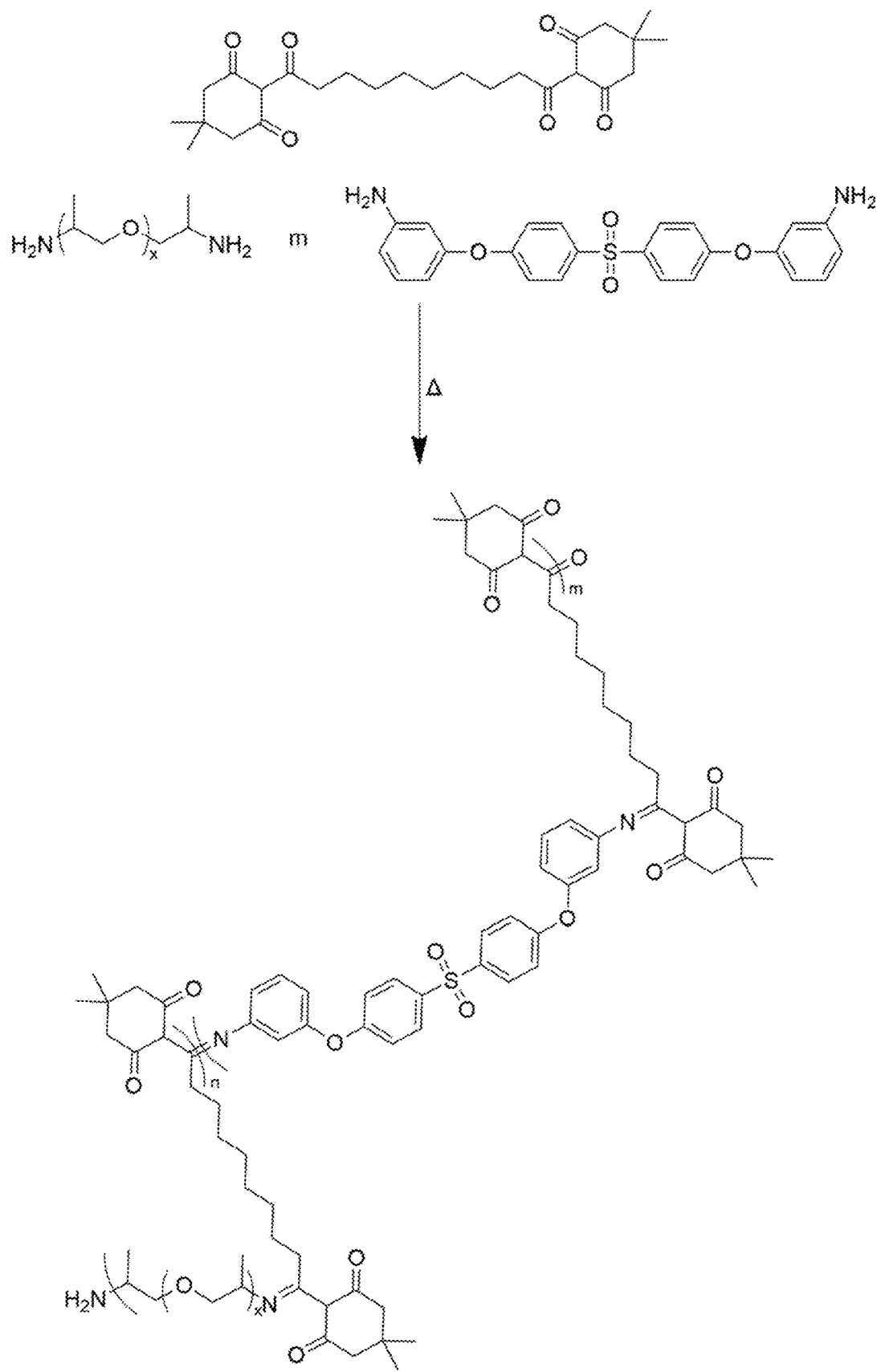
FIG. 1 depicts a summary of the synthesis of linear poly(diketoenamine) copolymers utilizing a triketone monomer, bis[4-(3-aminophenoxy)phenyl]sulfone monomer (m-BAPS), and Jeffamine D-400 polyetheramine, in Example 5.

The principles, structures, compositions, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying figures.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

Unless otherwise stated, all molecular weights herein are number-average molecular weights, Mn.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

Some variations of the disclosed technology provide synthesis and facile chemical degradation of thermoplastic copolymers, which may be segmented thermoplastic copolymers. The disclosure provides a range of thermoplastic copolymers and segmented thermoplastic copolymers with tunable degradation conditions based on the polymer backbone and optional side chains. The disclosed materials possess a range of processing parameters and mechanical properties that network polymers are unable to achieve, while maintaining the ability to degrade to monomer under specified, tunable conditions.

In this specification, a "copolymer" is defined as a polymer that has more than one type of monomer repeat unit. When only one type of monomer ("A") is used, a homopolymer results, which can be represented as AAAAA (arbitrary chain length and number of A units). When two types of monomers ("A" and "B") are used, a bipolymer results, which can be represented as ABABAB when it is an alternating bipolymer, and AAABBB when it is a block bipolymer, for example. When three types of monomers ("A", "B", and "C") are used, a terpolymer results, which can be represented in many ways depending on the molecular arrangement of the polymerized monomer units, such as ABCABC, AABBCC, ABACABAC, ABABACACABAC, etc. In the present disclosure, the thermoplastic copolymer contains at least three types of monomers: a difunctional triketone, a first diamine, and a second diamine. An exemplary thermoplastic copolymer that employs two different types of diamines is shown in FIG. 1 (see Example 5). A comparative polymer that only employs a single diamine (along with a difunctional triketone) would be a bipolymer, which is not a preferred form of copolymer in this disclosure. That is, in preferred embodiments, the thermoplastic copolymer is a thermoplastic terpolymer or a thermoplastic quaterpolymer.

Sustainable materials are becoming increasingly relevant as public interest turns toward the environmental impact of consumer goods. Low-cost devices, such as food containers, have property requirements that are easy to meet and, therefore, conventional materials such as polyethylene terephthalate (PET) are readily replaceable by sustainable materials polylactide (PLA). However, high-performance materials have more-stringent property requirements which many sustainable materials simply cannot meet. Many high-performance polymers are thermosets because of their strength at elevated temperatures. Many high-performance polymers utilize a highly crosslinked network that gives a high stress at break, but typically very little strain before fracture. These types of thermosets cannot be recycled and typically are not made from sustainable materials either.

The disclosed technology solves several simultaneous challenges. The disclosed thermoplastic copolymers that may be produced are thermally processable, allowing for a single device to be reused multiple times in potentially different ways. The disclosed thermoplastic copolymers are controllably degradable, allowing for a single feedstock to be used in multiple different materials at different times and places. Additionally, the disclosed compositions are polymerizable in the absence of solvent, further reducing the environmental impact.

Applications for the disclosed technology include sustainable materials and composites, repairable polymers and composites, modular vehicles (reversible bonding), re-use and recycling of polymers, and shape-morphing polymers. Specific applications include thermoplastic processable materials for cabin interiors (automotive and aerospace) and filled protective coatings that may be cleanly recycled down to individual monomers in a closed-loop manner, including separation of additives/fillers.

The disclosed technology provides a thermoplastic copolymer comprising: (a) a plurality of difunctional triketone species, or a reacted form thereof; (b) a plurality of a first diamine species, or a reacted form thereof, wherein the first diamine species contains one or more primary amine groups and/or one or more secondary amine groups, and wherein the first diamine species does not contain a tertiary amine group;

(c) a plurality of a second diamine species, or a reacted form thereof, wherein the second diamine species contains one or more primary amine groups and/or one or more secondary amine groups, wherein the second diamine species does not contain a tertiary amine group, and wherein the second diamine species is different than the first diamine species; and (d) optionally, a plurality of monofunctional amine-reactive groups, or a reacted form thereof.

In this specification, a "polymer" means there are at least 2 repeat units in the chain, such as from 2 to 1000 or more. In various embodiments, the number of repeat units in the thermoplastic polymer is at least, or at most, 2, 3, 4, 5, 6, 7, 8, 9, 10, 25, 50, 100, 150, 200, 250, 300, 400, 500, 600, 700, 800, 900, or 1000, including any intervening range.

A "plurality of difunctional triketone species, or a reacted form thereof" means that there are multiple instances of a difunctional triketone species, or a reacted form thereof, owing to the fact that there are multiple repeat units in the polymer.

A "reacted form" of the difunctional triketone species means that the difunctional triketone species have reacted, at least to some extent, with the amine species, to form a plurality of ketoenamine species, such as diketoenamine species. A "reacted form" of the first diamine species or the second diamine species means that those amine species have reacted, at least to some extent, with the difunctional triketone species, to form a plurality of ketoenamine species, such as diketoenamine species.

In the reacted form of the thermoplastic copolymer, there is a plurality of ketoenamine species derived from the difunctional triketone species. As the number of repeat units increases, the number of species also increases. In some embodiments, when there are n repeat units in the thermoplastic polymer, there are n total ketoenamine species, one in each repeat unit. A plurality here does not mean that there are two or more different types of ketoenamine species present in the polymer, although that is possible.

A "plurality of first diamine species, or a reacted form thereof" means that there are multiple instances of a first diamine species owing to the fact that there are multiple repeat units in the polymer. As the number of repeat units increases, the number of first diamine species also increases. Similarly, a "plurality of second diamine species, or a reacted form thereof" means that there are multiple instances of a second diamine species owing to the fact that there are multiple repeat units in the polymer. As the number of repeat units increases, the number of second diamine species also increases. A "plurality of monofunctional amine-reactive groups, or a reacted form thereof" means, when these groups are present, that there are multiple instances of monofunctional amine-reactive groups owing to the fact that there are multiple repeat units in the polymer.

In some embodiments, the difunctional triketone species contain a polyether. The polyether may be selected from the group consisting of polyethylene glycol, polypropylene glycol, polytetrahydrofuran, polypropanediols, perfluoropolyethers, siloxanes, and combinations thereof, for example.

In some embodiments, the ketoenamine species is derived from a difunctional triketone monomer having the structure:

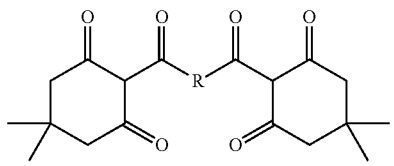

wherein R contains from 1 to 50 carbon atoms;
wherein R is a linear hydrocarbon group, a branched hydrocarbon group, a cyclic hydrocarbon group, or a combination thereof; and
wherein R contains carbon-carbon single bonds, carbon-carbon aromatic bonds, carbon-carbon double bonds, carbon-carbon triple bonds, or a combination thereof.

This difunctional triketone monomer is referred to as "difunctional" because the two ketone groups in the middle of the molecule, adjacent to the R group, are active for conversion to ketoenamine groups. A difunctional ketoenamine species is derived from the above difunctional triketone compound by chemically converting two ketone groups (C—C=O) to ketoenamine groups (C=C—N), upon exposure of the difunctional triketone compound to amine functional groups. Typically, in the case of the above structure, the two ketone groups that are adjacent to the interior R group are converted to ketoenamine groups, while the four ketone groups attached to the cyclohexane rings are not converted to ketoenamine groups. Depending on the chemical conditions, a small amount of the four ketone groups attached to the cyclohexane rings may also be converted to ketoenamine groups, which would also convert the cyclohexane ring into a cyclohexene, 1,3-cyclohexadiene, and/or 1,4-cyclohexadiene ring. A related difunctional ketone compound omits some or all of the four ketone groups attached to the cyclohexane rings. In certain embodiments, when only one of the ketone groups is converted to a ketoenamine group, the result is a monofunctional ketoenamine species.

In some embodiments, R is a linear hydrocarbon group, and wherein R contains from 4 to 12 carbon atoms, such as 4, 5, 6, 7, 8, 9, 10, 11, or 12 carbon atoms.

In some embodiments, R is a linear aromatic hydrocarbon group, such as one containing from 6 to 14 carbon atoms (e.g., 6, 10, or 14 carbon atoms). A "linear aromatic hydrocarbon group" is one in which the aromatic group is contained within the main chain of R, rather than being contained in side groups or branches from a main chain. In certain embodiments, R is selected from benzene, naphthalene, or anthracene.

In some embodiments, R is an aliphatic or aromatic linear species comprised of $(CH_2)_n$ wherein n=1 to 50. In various embodiments, n is 1, 2, 3, 4, 5, 6, 7, 8, 9, 10, 15, 20, 25, 30, 35, 40, 45, or 50.

In some embodiments, R is generally an aromatic hydrocarbon species, such as one containing from 6 to 24 carbon atoms. Note that a cyclic species requires that R contain at least three carbon atoms (e.g., cyclopropenium), and usually at least 6 carbon atoms (e.g., benzene). Also, the aromatic portion of an R group may be contained internally. An example is benzene with propyl groups on each end, so that R has 12 carbons, 6 of which are linear and 6 of which are aromatic.

In some embodiments, R is a branched species with two or more branches or arms. Note that a branched species requires that R contain at least two carbon atom. In certain embodiments, R is a branched species with three or more branches or arms.

In some embodiments, R is a cyclic aliphatic hydrocarbon group, such as one containing from 4 to 12 carbon atoms. Note that a cyclic species requires that R contain at least three carbon atoms. Also, the cyclic portion of an R group may be contained internally. An example is cyclohexane with butyl groups on each end, so that R has 14 carbons, 8 of which are linear and 6 of which are cyclic.

In some embodiments, the first diamine species and the second diamine species are independently selected from the group consisting of an aliphatic diamine, an aromatic diamine, an ether diamine, and combinations thereof. Typically, the first diamine species is chemically different than the second diamine species.

An aliphatic diamine may be selected from the group consisting of ethylene diamine, 1,2-diaminopropane, 1,3-diaminopropane, 1,2-cyclohexanediamine, 1,3-cyclohexanediamine, 1,4-cyclohexanediamine, and combinations thereof, for example.

An aromatic diamine is selected from the group consisting of bis[4-(3-aminophenoxy)phenyl]sulfone, poly(bis[4-(3-aminophenoxy)phenyl]sulfone), bis[4-(4-aminophenoxy) phenyl]sulfone, poly(bis[4-(4-aminophenoxy)phenyl] sulfone), benzene diamines, anthracene diamines, naphthalene diamines, 4,4'-diaminodiphenylmethane, 2,3-diaminophenol, 4,4'-oxydianiline, and combinations thereof, for example.

An ether diamine may be selected from the group consisting of polyethylene glycol diamine, polypropylene glycol diamine, polytetrahydrofuran diamine, polypropanediol diamines, perfluoropolyether diamines, siloxane diamines, 4,4'-oxydianiline, and combinations thereof, for example. In some embodiments, the ether diamine has a molecular weight selected from about 100 g/mol to about 10000 g/mol, such as about 200-5000 g/mol or about 200-2000 g/mol. An exemplary polypropylene glycol diamine is Jeffamine® polyetheramine, which is considered a polypropylene glycol diamine because it is based on the PPG backbone. Some compounds, such as 4,4'-oxydianiline and bis[4-(3-aminophenoxy)phenyl]sulfone, are both aromatic amines as well as ether amines.

Many isomers and homologues of the above-described diamines are possible, as will be recognized by one of ordinary skill in the chemical arts. For example, benzene diamines include benzene-1,2-diamine, benzene-1,3-diamine, and benzene-1,4-diamine, as isomers. In benzene diamines, there are 4 aromatic carbon atoms that are not bonded to $NH_2$, and are instead bonded to H. The H may be replaced by alkyl groups (e.g., methyl), hydroxyl groups, ether groups, sulfur groups, and so on.

In some embodiments, the first diamine species, the second diamine species, or both of these are α,ω-amine-terminated materials, such as bis[4-(3-aminophenoxy)phenyl]sulfone monomer (m-BAPS) and Jeffamine® polyetheramine. In other embodiments, the first diamine species, the second diamine species, or both of these have one terminal amine group and one internal amine group.

To generate materials with high strains at break, difunctional monomers are preferred, rather than trifunctional (or higher functionality) monomers. The use of difunctional monomers can result in linear polymers capable of complex conformations, depending on monomer composition. These linear polymers may be customized by utilizing multiple diamines in a single reaction that results in copolymers. Specific synthetic pathways create segmented copolymers, by allowing for microphase separation of segments, commonly referred to as "hard" and "soft" segments. The hard segments reinforce the storage modulus of the copolymer, while the soft segments allow for flexibility of the copolymer. In some embodiments, the thermoplastic copolymer is a segmented thermoplastic copolymer. The segmented thermoplastic copolymer may be a linear segmented thermoplastic copolymer. As one example, hard segments consisting of rigid aromatic-containing molecules may be combined with soft segments consisting of flexible polymeric diamines. Varying the length of the polymeric diamine segment as well as the ratio of soft segments to hard segments generates a range of adjustable mechanical properties.

The thermoplastic copolymer may be characterized by a glass-transition temperature $T_g$ from about −100° C. to about 200° C., for example. The $T_g$ may be determined using Differential Scanning calorimetry by heating a sample of the thermoplastic copolymer from 40° C. to 210° C. at +10° C. per minute, then cooling from 210° C. to −110° C. at −10° C. per minute, and then heating again from −110° C. to 210° C. at+10° C. per minute. The glass-transition temperature ($T_g$) can be determined at the midpoint half-height of the step transition on the second heating cycle. In various embodiments, the thermoplastic copolymer has a $T_g$ of about, at least about, or at most about −100° C., −90° C., −80° C., −70° C., −60° C., −50° C., −40° C., −30° C., −20° C., −10° C., 0° C., 10° C., 20° C., 30° C., 40° C., 50° C., 60° C., 70° C., 80° C., 90° C., 100° C., 110° C., 120° C., 130° C., 140° C., 150° C., 160° C., 170° C., 180° C., 190° C., or 200° C. including any intervening range.

In some embodiments, the monofunctional amine-reactive groups are present. The monofunctional amine-reactive groups may be selected from the group consisting of epoxy, oxalate, and isocyanate, for example.

When the monofunctional amine-reactive groups are epoxy groups, the epoxy groups may be provided by ethylene oxide, benzene oxide, glycidol (epoxypropyl alcohol), or a combination or derivative thereof, for example.

When the amine-reactive groups are oxalate groups, the oxalate groups may be provided by oxalic acid, dimethyl oxalate, diethyl oxalate, dipropyl oxalate, dicyclohexyl oxalate, dibenzyl oxalate, an oxalate salt (e.g., sodium oxalate or zinc oxalate), or a combination or derivative thereof, for example.

When the amine-reactive groups are isocyanate groups, the isocyanate groups may be provided by methyl isocyanate, cyclohexyl isocyanate, phenyl isocyanate, p-toluenesulfonyl isocyanate, or a combination or derivative thereof, for example.

The thermoplastic copolymer may further contain one or more additives (e.g., pigments) or fillers (e.g., clays). Additives or fillers may be used for a wide variety of reasons, ranging from improving mechanical properties (e.g., strength-enhancing nanoparticles), to reducing overall cost (e.g., inert fillers such as silica), to providing certain colors (e.g., pigments). Additives or fillers may be selected from the group consisting of toughening particles (e.g., polypropylene, polyethylene, or an ethylene-propylene copolymer), transparency-modifying particles, refractive index-modifying particles (e.g., high-refractive-index nanoparticles), flame-retardant particles, and combinations thereof. In some embodiments, additives or fillers are selected from the group consisting of Ge, CaF2, NaCl, KCl, KBr, diamond, Si, CsI, MgO, MgF$_2$, LiF, NaF, BaF$_2$, ZnS, ZnSe, PbS, PbSe, PbF$_2$, LiYF$_4$, NaYF$_4$, ThBrI, ThBrCl, Si, SiC, Ge, GaAs, AlN, AION, Al$_2$O$_3$, polyethylene, polypropylene, and combinations thereof. Organic or inorganic pigments may be incorporated. Multiple types of additives or filler particles may be present in the thermoplastic copolymer.

In certain embodiments, additive or filler particles are high-refractive-index nanoparticles selected from the group consisting of titanium dioxide, silicon, germanium, zinc oxide, silicon carbide, silicon dioxide, hafnium oxide, zinc selenide, zinc sulfide, sapphire, calcium fluoride, sodium fluoride, lithium fluoride, cesium fluoride, cesium bromide, potassium bromide, potassium iodide, and combinations thereof.

The additive or filler particles may vary widely in particle size. In some embodiments, the additive or filler particles have an average particle size from about 5 nanometers to about 100 microns, such as from about 10 nanometers to about 10 microns. The average particle size is the average diameter in the case of spherical particles and the average effective diameter in the case of non-spherical particles.

In this disclosure, particles sizes may be measured by a variety of techniques, including dynamic light scattering, laser diffraction, image analysis, or sieve separation, for example. Dynamic light scattering is a non-invasive, well-established technique for measuring the size and size distribution of particles typically in the submicron region, and with the latest technology down to 1 nanometer. Dynamic light scattering is a widely used particle-sizing technique for materials ranging from hundreds of nanometers up to several millimeters in size. Exemplary dynamic light scattering instruments and laser diffraction instruments for measuring particle sizes are available from Malvern Instruments Ltd., Worcestershire, UK. Image analysis to estimate particle sizes and distributions can be done directly on photomicrographs, scanning electron micrographs, or other images.

The additive or filler particles may be in the form of spheres, rods, whiskers, platelets, or a combination thereof, for example. The filler particles may have a spherical geometry or they may have a geometric aspect ratio greater than 1 along one or more Cartesian axes (e.g. rods, whiskers, or platelets).

In some embodiments, the additive or filler particles (when present) have an average volumetric loading from about 1 vol % to about 10 vol % based on volume of the thermoplastic plus volume of the filler particles, for example. In various embodiments, the average volumetric loading of the filler particles is about, or at most about 0.1, 0.5, 1, 2, 3, 4, 5, 10, 15, 20, or 25 vol %.

The additive or filler particles (when present) may be selected based upon their ability to toughen the underlying polymer matrix by means of crack tip blunting (reduced stress intensity factor), crack tip deflection (increased crack path length), or formation of local elastic heterogeneities that impose a residual compressive stress state around the fillers, or for other reasons, for example.

Some variations of the invention provide a method of making a thermoplastic copolymer, the method comprising:
(a) obtaining a difunctional triketone compound;
(b) obtaining a first diamine compound;
(c) obtaining a second diamine compound;
(d) optionally, obtaining a monofunctional amine-reactive compound;
(e) optionally, obtaining one or more additives or fillers;
(f) mixing the difunctional triketone compound with the first diamine compound, with the second diamine compound, with the amine-reactive compound if present, and with the additives or fillers if present, thereby forming a polymer precursor mixture;
(g) heating the polymer precursor mixture to cause reaction of the polymer precursor mixture, thereby forming a thermoplastic copolymer; and
(h) applying the thermoplastic copolymer and/or the polymer precursor mixture onto a substrate.

In some embodiments, the difunctional triketone compound is a recycled difunctional triketone compound. The recycled difunctional triketone compound may be recycled polymer, recycled oligomer, recycled monomer, or a combination thereof. The recycled material may include a ketoenamine compound, or another material that still contains ketoenamine groups which did not convert to triketone groups.

In some methods, the ketoenamine species contains a polyether. The polyether may be selected from the group consisting of polyethylene glycol, polypropylene glycol, polytetrahydrofuran, polypropanediols, perfluoropolyethers, siloxanes, and combinations thereof, for example.

In some methods, the difunctional triketone compound has the structure:

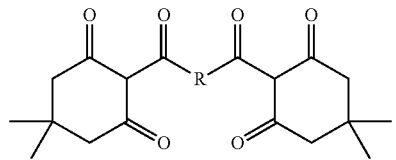

wherein R contains from 1 to 50 carbon atoms;
wherein R is a linear hydrocarbon group, a branched hydrocarbon group, a cyclic hydrocarbon group, or a combination thereof; and
wherein R contains carbon-carbon single bonds, carbon-carbon aromatic bonds, carbon-carbon double bonds, carbon-carbon triple bonds, or a combination thereof.

R may be a linear hydrocarbon group, such as one containing from 4 to 12 carbon atoms, such as 4, 5, 6, 7, 8, 9, 10, 11, or 12 carbon atoms.

R may be a linear aromatic group, such as one containing from 6 to 24 carbon atoms, such as 6, 7, 8, 9, 10, 11, 12, 13, 14, 15, 16, 17, 18, 19, 20, 21, 22, 23, or 24 carbon atoms. In certain embodiments, R is selected from benzene, naphthalene, or anthracene. Of course, many homologues, substitutions, and isomers are possible. For example, in the case of benzene, toluene or phenol may be used instead.

In some methods, the first diamine species and the second diamine species are independently selected from the group consisting of an aliphatic diamine, an aromatic diamine, an ether diamine, and combinations thereof.

An aliphatic diamine may be selected from the group consisting of ethylene diamine, 1,2-diaminopropane, 1,3-diaminopropane, 1,2-cyclohexanediamine, 1,3-cyclohexanediamine, 1,4-cyclohexanediamine, and combinations thereof, for example.

An aromatic diamine may be selected from the group consisting of bis[4-(3-aminophenoxy)phenyl]sulfone, poly(bis[4-(3-aminophenoxy)phenyl]sulfone), bis[4-(4-aminophenoxy)phenyl]sulfone, poly(bis[4-(4-aminophenoxy)phenyl]sulfone), benzene diamines, anthracene diamines, naphthalene diamines, 4,4'-diaminodiphenylmethane, 2,3-diaminophenol, 4,4'-oxydianiline, and combinations thereof, for example.

An ether diamine may be selected from the group consisting of polyethylene glycol diamine, polypropylene glycol diamine, polytetrahydrofuran diamine, polypropanediol diamines, perfluoropolyether diamines, siloxane diamines, 4,4'-oxydianiline, and combinations thereof, for example.

In some methods, step (d) is performed. The monofunctional amine-reactive compounds may be selected from the group consisting of epoxies, oxalates, and isocyanates, for example.

In some methods, step (e) is performed. Many additives or fillers are possible, including (but not limited to) pigments and clays, as described above.

A diketoenamine-containing compound may be mixed with the other components in step (f). Such diketoenamine-containing compound already contains diketoenamine groups and does not need to undergo triketone-to-diketoenamine conversion during polymer synthesis (e.g., in step (g)). The diketoenamine-containing compound may be added as a distinct species from the other components, or the diketoenamine-containing compound may be in mixed form with the difunctional triketone compound, such as in a recycled material that contains some functional triketone groups as well as some functional ketoenamine groups.

In some methods, step (f) utilizes a solvent for forming the polymer precursor mixture. When a solvent is used in step (f), the solvent may be any solvent that dissolves the difunctional triketone compound and the first and second diamine compounds. If the optional amine-reactive compounds are also present, the solvent may also dissolve those compounds. The solvent need not dissolve the additives or fillers, if present. In some embodiments, a solvent in step (f) is selected from the group consisting of tetrahydrofuran, methyl ethyl ketone, methyl propyl ketone, methyl isobutyl ketone, acetone, diethyl ether, n-butyl acetate, toluene, benzene, xylenes, hexanes, methylene chloride, and combinations thereof, for example.

Step (f) may be conducted at various temperatures, such as from about 0° C. to about 50° C., or from about 20° C. to about 30° C. (e.g., room temperature, about 25° C.). The mixing time in step (f) may vary widely, such as from about 1 minute to about 24 hours, so that the components become well-mixed. Various types of mixing may be employed, including (but not limited to) agitation using an impeller or magnetic stir bar, sonication, vessel rotation or vibration, liquid recirculation, or simple diffusion.

The heating time in step (g) may vary widely, such as from about 1 minute to about 24 hours, so that the components are effectively polymerized. Step (g) may be conducted at various polymerization temperatures, such as from about 50° C. to about 200° C., for example.

In some preferred methods, solvent-free melt polymerization is employed. When using solvent-free melt polymerization, no solvent is used in step (f) or in step (g) (polymerization).

In some methods, step (f) utilizes a solvent for forming the polymer precursor mixture. In certain methods, step (h) utilizes dissolving (in the solvent) and then spraying (e.g., spray coating) the thermoplastic polymer onto the substrate. In certain methods, step (h) utilizes solution casting the thermoplastic polymer onto the substrate. In solution casting, the thermoplastic polymer is dissolved in a solvent, forming a solution.

In some methods, step (h) utilizes injection molding the thermoplastic polymer onto the substrate. Injection molding may utilize a solvent, or may instead use neat polymer without a solvent.

In some methods, step (h) utilizes thermoforming the thermoplastic polymer onto the substrate. Thermoforming may utilize a solvent, or may instead use neat polymer without a solvent.

Steps (g) and (h) may be carried out simultaneously, applying the thermoplastic copolymer onto the substrate as the thermoplastic copolymer is being formed. These embodiments may utilize a solvent, or may instead use melt polymerization without a solvent.

Generally, the thermoplastic copolymer may be prepared and then deposited over an area of interest, which is the substrate. The substrate may have a large area, such as the scale of a vehicle or aircraft. Any known methods to deposit the thermoplastic copolymer may be employed. The thermoplastic copolymer may be applied to a surface using any coating technique, such as (but not limited to) spray coating, dip coating, doctor-blade coating, spin coating, air knife coating, curtain coating, single-layer or multilayer slide coating, gap coating, knife-over-roll coating, metering rod (Meyer bar) coating, reverse roll coating, rotary screen coating, extrusion coating, casting, or printing. The thermoplastic copolymer may be rapidly sprayed or cast in thin layers over large areas (such as multiple square meters).

The reaction conditions in step (g) are generally selected to ultimately form a thermoplastic copolymer, and one skilled in the chemistry art will be able to select the time, temperature, pressure, water concentration, and so on, or find optimum conditions using routine experimentation.

Steps (g) and (h) may be conducted at various temperatures, such as from about 30° C. to about 200° C., e.g. about, at least about, or at most about 30° C., 40° C., 50° C., 60° C., 70° C., 80° C., 90° C., 100° C., 110° C., 120° C., 130° C., 140° C., 150° C., 160° C., 170° C., 180° C., 190° C., or 200° C., including any intervening range.

Step (h) may be conducted at various pressures, such as from about 0.1 bar to about 10 bar, e.g. about, at least about, or at most about 0.1 bar, 0.5 bar, 0.8 bar, 0.9 bar, 1.0 bar, 1.1 bar, 1.2 bar, 1.5 bar, 2 bar, 3 bar, 4 bar, 5 bar, or 10 bar, including any intervening range.

Steps (g) and (h) may be conducted at various times, such as from about 10 minutes to about 12 hours, e.g. about, at least about, or at most about 0.1, 0.2, 0.3, 0.4, 0.5, 1, 1.5, 2, 2.5, 3, 4, 5, 6, 7, 8, 9, 10, 11, or 12 hours, including any intervening range.

Step (h) ordinarily does not employ agitation of the thermoplastic copolymer, which is disposed on the substrate. However, the entire system containing the thermoplastic copolymer on the substrate may be agitated in some way that enhances mass transfer by diffusion or convection. Such agitation may be intentional, such as via rotation, vibration, or sonication; or may be passive, such as via movement of the substrate taking place anyway (e.g., a moving vehicle).

In some variations, at a later time and usually different place, the thermoplastic copolymer that had been made in step (g) is then intentionally depolymerized. In these variations, the method further comprises depolymerizing the thermoplastic copolymer, thereby generating recycled thermoplastic monomers. Depolymerizing is synonymous with digestion, in this specification. After depolymerizing, the thermoplastic copolymer is converted to monomers, oligomers, polymer fragments, or a combination thereof, as well as any additives or fillers that were present in the thermoplastic copolymer (additives and fillers generally do not react during depolymerization).

In typical methods, depolymerizing is carried out using exposure of the thermoplastic copolymer to an aqueous acid. An aqueous acid may be selected from hydrochloric acid, sulfuric acid, or a combination thereof, for example. Other acids, both inorganic and organic, may be employed for depolymerization; examples include para-toluenesulfonic acid, nitrous acid, acetic acid, and lactic acid. The acid may be an acid catalyst that is not consumed in the depolymerization reaction. Alternatively, the acid (or hydrogen derived from the acid) may be consumed to some extent in the depolymerization reaction. In some embodiments, water is a depolymerization reactant, while in other cases, water is not consumed but used to moderate the strength of the acid and/or serve as a reaction solvent. The depolymerization pH may be selected from about −2 to about 6, such as about, at least about, or at most about −2, −1, 0, 1, 2, 3, 4, 5, or 6, including any intervening range.

In some methods, depolymerizing is carried out using exposure of the thermoplastic copolymer to an organic solvent, in addition to the aqueous acid. An organic solvent may be selected from the group consisting of tetrahydrofuran, methyl ethyl ketone, methyl propyl ketone, methyl isobutyl ketone, acetone, diethyl ether, n-butyl acetate, toluene, benzene, xylenes, hexanes, methylene chloride, and combinations thereof, for example. In some embodiments, the depolymerization solvent is inert but assists the reaction by dissolving the reactants and products, thereby removing diffusion limitations, for example. In some embodiments, the depolymerization solvent is itself inert (does not react and is not produced) but influences the chemistry (thermodynamics and/or kinetics) in what is known as the solvent effect. Solvents can have an effect on solubility, stability, and reaction rates. Different solvents can affect the equilibrium constant of a reaction by differential stabilization of a reactant or product. The equilibrium is shifted in the direction of the substance that is preferentially stabilized. Stabilization of the reactant or product can occur through non-covalent interactions with the solvent such as H-bonding, dipole-dipole interactions, or van der Waals interactions. In certain embodiments, the solvent itself is reactive in the depolymerization and may be consumed to some extent.

In some methods, depolymerizing is carried out using exposure of the thermoplastic copolymer to an elevated temperature, such as a temperature selected from about 30° C. to about 200° C., or from about 40° C. to about 100° C., or from about 40° C. to about 70° C. In various embodiments, the elevated temperature for depolymerization is about, at least about, or at most about 30° C., 40° C., 50° C., 60° C., 70° C., 80° C., 90° C., 100° C., 110° C., 120° C., 130° C., 140° C., 150° C., 160° C., 170° C., 180° C., 190° C., or 200° C., including any intervening range. At an elevated temperature, it is believed that depolymerization may be aided by heat, with a reaction rate that is dictated by the temperature (faster at higher temperatures), as well as by the concentration of aqueous acid.

Various combinations of means for depolymerization may be used. In some embodiments, depolymerizing is carried out using exposure of the thermoplastic copolymer to an aqueous acid as well as to an organic solvent. In these embodiments, the aqueous acid may be hydrochloric acid, sulfuric acid, or a combination thereof, and the organic solvent may be tetrahydrofuran, methyl ethyl ketone, methyl propyl ketone, methyl isobutyl ketone, acetone, diethyl ether, n-butyl acetate, toluene, benzene, xylenes, hexanes, methylene chloride, or a combination thereof.

In some embodiments, depolymerizing is carried out using exposure of the thermoplastic copolymer to an aqueous acid as well as to an elevated temperature. In these embodiments, the aqueous acid may be hydrochloric acid, sulfuric acid, or a combination thereof, and the elevated temperature may be about, at least about, or at most about 30° C., 40° C., 50° C., 60° C., 70° C., 80° C., 90° C., 100° C., 110° C., 120° C., 130° C., 140° C., 150° C., 160° C., 170° C., 180° C., 190° C., or 200° C., including any intervening range. In certain embodiments, depolymerization is not effective with hydrochloric acid and/or sulfuric acid at a temperature of only 25° C., i.e. an elevated temperature is necessary.

In some embodiments, depolymerizing is carried out using exposure of the thermoplastic copolymer to an aqueous acid, an organic solvent, and an elevated temperature. In these embodiments, the aqueous acid may be hydrochloric acid, sulfuric acid, or a combination thereof; the organic solvent may be tetrahydrofuran, methyl ethyl ketone, methyl propyl ketone, methyl isobutyl ketone, acetone, diethyl ether, n-butyl acetate, toluene, benzene, xylenes, hexanes, methylene chloride, or a combination thereof; and the elevated temperature may be about, at least about, or at most about 30° C., 40° C., 50° C., 60° C., 70° C., 80° C., 90° C., 100° C., 110° C., 120° C., 130° C., 140° C., 150° C., 160° C., 170° C., 180° C., 190° C., or 200° C., including any intervening range.

The time for depolymerization will generally depend on the choice and concentration of acid, choice of solvent (if any), and temperature. In various embodiments, the time for depolymerization is from about 1 minute to about 24 hours, such as from about 10 minutes to about 4 hours, e.g. about, at least about, or at most about 0.1, 0.2, 0.3, 0.4, 0.5, 1, 2, 3, 4, 5, 6, 7, 8, 9, 10, 11, 12, 18, or 24 hours, including any intervening range.

In preferred embodiments, recycled thermoplastic monomers form at least part of the difunctional ketone compound, the first diamine compound, and/or the second diamine compound.

Steps (a) to (h) may be repeated multiple times in a closed loop. The number of loops may vary widely, such as from 1 to 1000, for example.

In some embodiments, the thermoplastic copolymer is fully formed and then applied to a substrate in heated form, such as above the $T_g$ of the thermoplastic copolymer. In these embodiments, a method of making a thermoplastic copolymer comprises:

(a) obtaining a difunctional triketone compound;
(b) obtaining a first diamine compound;
(c) obtaining a second diamine compound;
(d) optionally, obtaining a monofunctional amine-reactive compound;
(e) optionally, obtaining one or more additives or fillers;
(f) mixing the difunctional triketone compound with the first diamine compound, with the second diamine compound, with the amine-reactive compound if present, and with the additives or fillers if present, thereby forming a polymer precursor mixture;
(g) heating the polymer precursor mixture to cause reaction of the polymer precursor mixture, thereby forming a thermoplastic copolymer; and
(h) applying the thermoplastic copolymer onto a substrate.

Some variations of the invention provide a method of making a segmented thermoplastic copolymer, the method comprising:
(a) obtaining a difunctional triketone compound;
(b) obtaining a first diamine compound;
(c) obtaining a second diamine compound;
(d) optionally, obtaining a monofunctional amine-reactive compound;
(e) optionally, obtaining one or more additives or fillers;
(f) mixing the difunctional triketone compound with the first diamine compound and with the amine-reactive compound if present, thereby forming a first polymer precursor mixture;
(g) heating the first polymer precursor mixture for a first period of time;
(h) mixing the first polymer precursor mixture with the second diamine compound and with the additives or fillers if present, thereby forming a second polymer precursor mixture;
(i) heating the second polymer precursor mixture for a second period of time, and reacting the second polymer precursor mixture to form a segmented thermoplastic copolymer; and
(j) applying and/or forming the segmented thermoplastic copolymer onto a substrate.

In some methods of making a segmented thermoplastic copolymer, the difunctional triketone compound is a recycled difunctional triketone compound. The recycled difunctional triketone compound may be recycled polymer, recycled oligomer, recycled monomer, or a combination thereof. The recycled material may include a ketoenamine compound, or another material that still contains ketoenamine groups which did not convert to triketone groups.

In some methods of making a segmented thermoplastic copolymer, the difunctional triketone species contains a polyether. The polyether may be selected from the group consisting of polyethylene glycol, polypropylene glycol, polytetrahydrofuran, polypropanediols, perfluoropolyethers, siloxanes, and combinations thereof, for example.

In some methods of making a segmented thermoplastic copolymer, the difunctional triketone compound has the structure:

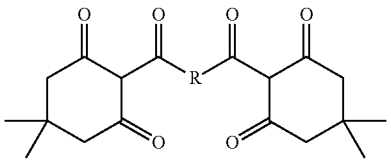

wherein R contains from 1 to 50 carbon atoms;
wherein R is a linear hydrocarbon group, a branched hydrocarbon group, a cyclic hydrocarbon group, or a combination thereof; and
wherein R contains carbon-carbon single bonds, carbon-carbon aromatic bonds, carbon-carbon double bonds, carbon-carbon triple bonds, or a combination thereof.

In some methods of making a segmented thermoplastic copolymer, R is a linear hydrocarbon group, such as a linear hydrocarbon group containing from 4 to 12 carbon atoms. In some methods, R is selected from benzene, naphthalene, or anthracene. Any R group disclosed in this specification for making thermoplastic copolymers may be used for making segmented thermoplastic copolymers, in some embodiments.

In some methods of making a segmented thermoplastic copolymer, the first diamine species and the second diamine species are independently selected from the group consisting of an aliphatic diamine, an aromatic diamine, an ether diamine, and combinations thereof.

An aliphatic diamine may be selected from the group consisting of ethylene diamine, 1,2-diaminopropane, 1,3-diaminopropane, 1,2-cyclohexanediamine, 1,3-cyclohexanediamine, 1,4-cyclohexanediamine, and combinations thereof, for example.

An aromatic diamine may be selected from the group consisting of bis[4-(3-aminophenoxy)phenyl]sulfone, poly(bis[4-(3-aminophenoxy)phenyl]sulfone), bis[4-(4-aminophenoxy)phenyl]sulfone, poly(bis[4-(4-aminophenoxy)phenyl]sulfone), benzene diamines, anthracene diamines, naphthalene diamines, 4,4'-diaminodiphenylmethane, 2,3-diaminophenol, 4,4'-oxydianiline, and combinations thereof, for example.

An ether diamine may be selected from the group consisting of polyethylene glycol diamine, polypropylene glycol diamine, polytetrahydrofuran diamine, polypropanediol diamines, perfluoropolyether diamines, siloxane diamines, 4,4'-oxydianiline, and combinations thereof, for example.

In some methods of making a segmented thermoplastic copolymer, step (d) is performed. The monofunctional amine-reactive compounds may be selected from the group consisting of epoxies, oxalates, and isocyanates, for example.

In some methods of making a segmented thermoplastic copolymer, step (e) is performed. Many additives or fillers are possible, including but not limited to pigments and clays.

A diketoenamine-containing compound may be mixed with the other components in step (f) and/or in step (h). The diketoenamine-containing compound already contains diketoenamine groups and does not need to undergo ketone-to-diketoenamine conversion during polymer synthesis (e.g., in step (i)). The diketoenamine-containing compound may be added as a distinct species from the other components, or the diketoenamine-containing compound may be in mixed form with the difunctional triketone compound, such as in a recycled material that contains some functional triketone groups as well as some functional ketoenamine groups.

In some methods of making a segmented thermoplastic copolymer, step (f) utilizes a solvent for forming the first polymer precursor mixture. In these or other methods, step (h) may utilize a solvent for forming the second polymer precursor mixture; such solvent may be the same solvent as in step (f), or a different solvent, if step (f) utilizes a solvent.

In some methods of making a segmented thermoplastic copolymer, steps (f) and (h) may be conducted at various temperatures, such as from about 0° C. to about 50° C., or from about 20° C. to about 30° C. (e.g., room temperature, about 25° C.). The mixing time in steps (f) and (h) may vary widely, such as from about 1 minute to about 24 hours, to ensure the components become well-mixed. Various types of mixing may be employed, including (but not limited to) agitation using an impeller or magnetic stir bar, sonication, vessel rotation or vibration, liquid recirculation, or simple diffusion.

In some preferred methods of making a segmented thermoplastic copolymer, solvent-free melt polymerization is employed. When using solvent-free melt polymerization, no solvent is used in steps (f) to (j) or in polymerization.

In some methods of making a segmented thermoplastic copolymer, the reaction conditions in steps (g), (i), and (j) are generally selected to ultimately form a thermoplastic copolymer, and one skilled in the chemistry art will be able to select the time, temperature, pressure, water concentration, and so on, or find optimum conditions with routine experimentation.

In some methods of making a segmented thermoplastic copolymer, step (g) may be conducted at various temperatures, such as from about 40° C. to about 200° C., such as from about 90° C. to about 150° C., e.g. about, at least about, or at most about 40° C., 50° C., 60° C., 70° C., 80° C., 90° C., 100° C., 110° C., 120° C., 130° C., 140° C., 150° C., 160° C., 170° C., 180° C., 190° C., or 200° C., including any intervening range.

In some methods of making a segmented thermoplastic copolymer, step (g) may be conducted at various pressures, such as from about 0.1 bar to about 10 bar, e.g. about, at least about, or at most about 0.1 bar, 0.5 bar, 0.8 bar, 0.9 bar, 1.0 bar, 1.1 bar, 1.2 bar, 1.5 bar, 2 bar, 3 bar, 4 bar, 5 bar, or 10 bar, including any intervening range.

In some methods of making a segmented thermoplastic copolymer, step (g) may be conducted at various times, such as from about 10 minutes to about 24 hours, e.g. about, at least about, or at most about 0.1, 0.2, 0.3, 0.4, 0.5, 1, 2, 3, 4, 5, 6, 7, 8, 9, 10, 11, 12, 16, 20, or 24 hours, including any intervening range.

In some methods of making a segmented thermoplastic copolymer, step (i) may be conducted at various temperatures, such as from about 40° C. to about 200° C., such as from about 90° C. to about 150° C., e.g. about, at least about, or at most about 40° C., 50° C., 60° C., 70° C., 80° C., 90° C., 100° C., 110° C., 120° C., 130° C., 140° C., 150° C., 160° C., 170° C., 180° C., 190° C., or 200° C., including any intervening range.

In some methods of making a segmented thermoplastic copolymer, step (i) may be conducted at various pressures, such as from about 0.1 bar to about 10 bar, e.g. about, at least about, or at most about 0.1 bar, 0.5 bar, 0.8 bar, 0.9 bar, 1.0 bar, 1.1 bar, 1.2 bar, 1.5 bar, 2 bar, 3 bar, 4 bar, 5 bar, or 10 bar, including any intervening range.

In some methods of making a segmented thermoplastic copolymer, step (i) may be conducted at various times, such as from about 10 minutes to about 24 hours, e.g. about, at least about, or at most about 0.1, 0.2, 0.3, 0.4, 0.5, 1, 2, 3, 4, 5, 6, 7, 8, 9, 10, 11, 12, 16, 20, or 24 hours, including any intervening range.

In some methods of making a segmented thermoplastic copolymer, step (j) utilizes spraying the segmented thermoplastic copolymer mixture onto the substrate. In some methods, step (j) utilizes casting the segmented thermoplastic copolymer mixture onto the substrate.

Generally, the segmented thermoplastic copolymer mixture may be prepared and then deposited over an area of interest, which is the substrate. The substrate may have a large area, such as the scale of a vehicle or aircraft. Any known methods to deposit the segmented thermoplastic copolymer may be employed. The segmented thermoplastic copolymer may be applied to a surface using any coating technique, such as (but not limited to) spray coating, dip coating, doctor-blade coating, spin coating, air knife coating, curtain coating, single-layer or multilayer slide coating, gap coating, knife-over-roll coating, metering rod (Meyer bar) coating, reverse roll coating, rotary screen coating, extrusion coating, casting, or printing. The segmented thermoplastic copolymer may be rapidly sprayed or cast in thin layers over large areas (such as multiple square meters).

In methods of making a segmented thermoplastic copolymer, step (j) ordinarily does not employ agitation. However, the entire system containing the second polymer precursor mixture on substrate may be agitated in some way that enhances mass transfer by diffusion or convection. Such agitation may be intentional, such as via rotation, vibration, or sonication; or may be passive, such as via movement of the substrate taking place anyway (e.g., a moving vehicle).

In some methods of making a segmented thermoplastic copolymer, the fully formed segmented thermoplastic copolymer is applied to the substrate. In other methods, steps (i) and (j) are performed simultaneously, such that the segmented thermoplastic copolymer is being formed at the same time as the second polymer precursor mixture is being applied to the substrate.

In some variations, at a later time and usually different place, the segmented thermoplastic copolymer that had been applied to the substrate in step (j) is then intentionally depolymerized. In these variations, the method further comprises depolymerizing the segmented thermoplastic copolymer, thereby generating recycled thermoplastic monomers. After depolymerizing, the segmented thermoplastic copolymer is converted to monomers, oligomers, polymer fragments, or a combination thereof, as well as any additives or fillers that were present in the segmented thermoplastic copolymer.

In typical methods of making (and using) a segmented thermoplastic copolymer, depolymerizing is carried out using exposure of the segmented thermoplastic copolymer to an aqueous acid. An aqueous acid may be selected from hydrochloric acid, sulfuric acid, or a combination thereof, for example. Other acids, both inorganic and organic, may be employed for depolymerization; examples include para-toluenesulfonic acid, nitrous acid, acetic acid, and lactic acid. The acid may be an acid catalyst that is not consumed in the depolymerization reaction. Alternatively, the acid (or hydrogen derived from the acid) may be consumed to some extent in the depolymerization reaction. In some embodiments, water is a depolymerization reactant, while in other cases, water is not consumed but used to moderate the strength of the acid and/or serve as a reaction solvent. The depolymerization pH may be selected from about −2 to about 6, such as about, at least about, or at most about −2, −1, 0, 1, 2, 3, 4, 5, or 6, including any intervening range.

In some methods of making (and using) a segmented thermoplastic copolymer, depolymerizing is carried out using exposure of the segmented thermoplastic copolymer to an organic solvent, in addition to the aqueous acid. An organic solvent may be selected from the group consisting of tetrahydrofuran, methyl ethyl ketone, methyl propyl ketone, methyl isobutyl ketone, acetone, diethyl ether, n-butyl acetate, toluene, benzene, xylenes, hexanes, methylene chloride, and combinations thereof, for example. In some embodiments pertaining to segmented thermoplastic copolymers, the depolymerization solvent is inert but assists the reaction by dissolving the reactants and products, thereby removing diffusion limitations, for example. In some embodiments, the depolymerization solvent is itself inert (does not react and is not produced) but influences the chemistry (thermodynamics and/or kinetics) in what is known as the solvent effect. Solvents can have an effect on solubility, stability, and reaction rates. Different solvents can affect the equilibrium constant of a reaction by differential stabilization of a reactant or product. The equilibrium is shifted in the direction of the substance that is preferentially stabilized. Stabilization of the reactant or product can occur through non-covalent interactions with the solvent such as H-bonding, dipole-dipole interactions, or van der Waals interactions. In certain embodiments, the solvent itself is reactive in the depolymerization and may be consumed to some extent.

In some methods of making (and using) a segmented thermoplastic copolymer, depolymerizing is carried out using exposure of the segmented thermoplastic copolymer to an elevated temperature, such as a temperature selected from about 30° C. to about 200° C., or from about 40° C. to about 100° C., or from about 40° C. to about 70° C. In various embodiments, the elevated temperature for depolymerization is about, at least about, or at most about 30° C., 40° C., 50° C., 60° C., 70° C., 80° C., 90° C., 100° C., 110° C., 120° C., 130° C., 140° C., 150° C., 160° C., 170° C., 180° C., 190° C., or 200° C., including any intervening range. At an elevated temperature, it is believed that depolymerization of the segmented copolymer is aided by heat, with a reaction rate that is dictated by the temperature (faster at higher temperatures), as well as by the concentration of an aqueous acid.

Various combinations of means for depolymerization may be used. In some embodiments, depolymerizing is carried out using exposure of the segmented thermoplastic copolymer to an aqueous acid as well as to an organic solvent. In these embodiments, the aqueous acid may be hydrochloric acid, sulfuric acid, or a combination thereof, and the organic solvent may be tetrahydrofuran, methyl ethyl ketone, methyl propyl ketone, methyl isobutyl ketone, acetone, diethyl ether, n-butyl acetate, toluene, benzene, xylenes, hexanes, methylene chloride, or a combination thereof.

In some methods of making (and using) a segmented thermoplastic copolymer, depolymerizing is carried out using exposure of the segmented thermoplastic copolymer to an aqueous acid as well as to an elevated temperature. In these embodiments, the aqueous acid may be hydrochloric acid, sulfuric acid, or a combination thereof, and the elevated temperature may be about, at least about, or at most about 30° C., 40° C., 50° C., 60° C., 70° C., 80° C., 90° C., 100° C., 110° C., 120° C., 130° C., 140° C., 150° C., 160° C., 170° C., 180° C., 190° C., or 200° C., including any intervening range. In certain embodiments, depolymerization is not effective with hydrochloric acid and/or sulfuric acid at a temperature of only 25° C., i.e. an elevated temperature is necessary.

In some methods of making (and using) a segmented thermoplastic copolymer, depolymerizing is carried out using exposure of the segmented thermoplastic copolymer to an aqueous acid, an organic solvent, and an elevated temperature. In these embodiments, the aqueous acid may be hydrochloric acid, sulfuric acid, or a combination thereof; the organic solvent may be tetrahydrofuran, methyl ethyl ketone, methyl propyl ketone, methyl isobutyl ketone, acetone, diethyl ether, n-butyl acetate, toluene, benzene, xylenes, hexanes, methylene chloride, or a combination thereof; and the elevated temperature may be about, at least about, or at most about 30° C., 40° C., 50° C., 60° C., 70° C., 80° C., 90° C., 100° C., 110° C., 120° C., 130° C., 140° C., 150° C., 160° C., 170° C., 180° C., 190° C., or 200° C., including any intervening range.

The time for depolymerization will generally depend on the choice and concentration of acid, the solvent (if any), and the temperature. In various embodiments, the time for depolymerization is from about 1 minute to about 24 hours, such as from about 10 minutes to about 4 hours, e.g. about, at least about, or at most about 0.1, 0.2, 0.3, 0.4, 0.5, 1, 2, 3, 4, 5, 6, 7, 8, 9, 10, 11, 12, 18, or 24 hours, including any intervening range.

In preferred embodiments, recycled thermoplastic monomers (derived from depolymerizing the segmented thermoplastic copolymer) form at least part of the difunctional triketone compound, the first diamine compound, and/or the second diamine compound.

Steps (a) to (j) may be repeated multiple times in a closed loop. The number of loops may vary widely, such as from 1 to 1000, for example.

In some embodiments, a segmented thermoplastic copolymer is fully formed and then applied to a substrate in heated form, such as above the $T_g$ of the segmented thermoplastic copolymer. In some embodiments, a method of making a segmented thermoplastic copolymer comprises:

(a) obtaining a difunctional ketone compound;
(b) obtaining a first diamine compound;
(c) obtaining a second diamine compound;
(d) optionally, obtaining a monofunctional amine-reactive compound;
(e) optionally, obtaining one or more additives or fillers;
(f) mixing the difunctional ketone compound with the first diamine compound and with the amine-reactive compound if present, thereby forming a first polymer precursor mixture;
(g) heating the first polymer precursor mixture for a first period of time;
(h) mixing the first polymer precursor mixture with the second diamine compound and with the additives or fillers if present, thereby forming a second polymer precursor mixture;
(i) heating the second polymer precursor mixture for a second period of time;
(j) reacting the second polymer precursor mixture to form a segmented thermoplastic copolymer; and
(k) applying the segmented thermoplastic copolymer onto a substrate.

EXAMPLES

Materials 5,5-dimethyl-1,3-cyclohexanedione (dimedone), sebacic acid, N,N'-dicyclohexylcarbodiimide (DCC), 4-dimethylaminopyridine (DMAP), dichloromethane ($CHCl_2$), hydrochloric acid (HCl), magnesium sulfate, ethyl acetate, and triethylenetetramine (TETA) are purchased from Sigma-Aldrich, Inc. (St. Louis, Missouri, USA) and used as received. Bis[4-(3-aminophenoxy)phenyl]sulfone monomer (m-BAPS) is purchased from TCI Chemicals (Portland, Oregon, USA) and used as received. Jeffamine® D-400 (hereinafter, "D-400") is provided by Huntsman Corporation (The Woodlands, Texas, USA) and used as received. D-400 is a polyetheramine characterized by repeating oxypropylene units in the backbone and is a difunctional, primary amine with average molecular weight of about 430 g/mol.

Example 1: Analysis of Polymer Thermal Properties via Differential Scanning calorimetry (DSC)

Polymer samples are weighed into a tared aluminum DSC pan and hermetically sealed with an aluminum DSC lid. DSC pans are placed into a Discovery 250 DSC manufactured by TA Instruments (Eden Prairie, Minnesota, USA). Samples are heated from 40° C. to 210° C. at +10° C. per minute. Samples are then cooled from 210° C. to –110° C. at –10° C. per minute. Samples are then heated from –110° C. to 210° C. at +10° C. per minute. The glass-transition temperature ($T_g$) is determined at the midpoint half-height of the step transition on the second heating cycle.

Example 2: Analysis of Polymer Decomposition via Thermogravimetric Analysis (TGA)

Polymer samples are weighed into a tared platinum high-temperature TGA pan. Samples are loaded into a Discovery 550 TGA manufactured by TA Instruments. Samples are heated at 10° C. per minute from ambient temperature (about 20° C. in this example) to 1000° C. under a positive flow of dry N2 gas. Ta5% is defined as the point at which 95% of the initial sample weight remained.

Example 3: Analysis of Polymer Rheological Properties via Parallel Plate Rheometry A Kinexus rheometer manufactured by Malvern Panalytical (Malvern, United Kingdom) is operated utilizing a parallel-plate geometry. The upper plate used a PU25 disposable aluminum plate, and the lower plate used a PL56 disposable aluminum sheet. The platens are set to 40° C. above the polymer's $T_g$ as previously determined via DSC according to Example 1. Polymer is loaded onto the heated platens, and equilibrated for 5 minutes before sample loading. The gap is then set to 1 mm. Polymer is analyzed at static shear in 5° C. increments from loading conditions to 150° C. The shear rate is held at a static 1 Hz, the polling rate is set to 0.2 Hz, and the polling duration is set to 1 minute. Rheology curves are created from data point 11 at each temperature to ensure a steady state of analysis. Data is then plotted as shear viscosity (cP) versus temperature (° C.).

Example 4: Synthesis of Sebacic Acid-Based Difunctional Triketone Monomer

Sebacic acid (1.0 eq.), dimedone (2.1 eq.), and N,N-dimethyl-4-amino pyridine (3.0 eq.) are dissolved in dichloromethane (14.0 eq.) and labeled solution A. In a separate container, dicyclohexylcarbodiimide (2.4 eq.) is dissolved in dichloromethane (16.0 eq.) and labeled solution B. Solution B is added dropwise to solution A with vigorous stirring at room temperature (about 25° C.). The reaction vessel is stirred at ambient conditions for 4 hours. The reaction solution is then gravity-filtered through filter paper. The filtered solids are washed with additional dichloromethane until the solids are completely white. The reaction solution is then washed with 1 M hydrochloric acid until the aqueous layer has pH<3 according to pH paper or a pH meter. Organics are then dried over magnesium sulfate for at least 5 minutes and filtered to ensure a fully dried product. Solvent is removed by rotary evaporation and, if necessary, high vacuum. The crude product is then recrystallized in ethyl acetate in a ratio of 1.5 mL of ethyl acetate per gram of crude product. The recrystallization product is heated to 55° C. in a water bath until all solids fully dissolve, then hot gravity-filtered, and then refrigerated at 5° C. overnight. The resulting crystal mat is broken up, vacuum-filtered, and dried under high vacuum to remove all traces of excess solvent. The product is a diketoenamine precursor.

The structure of the diketoenamine precursor (difunctional triketone monomer) is

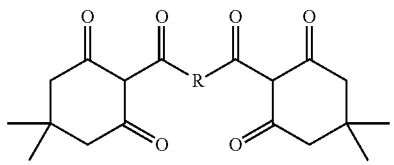

which is a generic structure, with R=C8 alkyl chain in this Example 4 (sebacic acid is OOOC(CH$_2$)$_8$COOH). The two ketone groups closest to R are reacted with primary amines to form two diketoenamine linkages capable of vitrimeric exchange and acidic reversion.

Example 5: Synthesis of Linear Thermoplastic Poly(diketoenamine) Copolymers

A temperature controller with a thermocouple is connected to a suitably sized heating mantle. The triketone monomer of Example 4 (1 eq.), m-BAPS (n eq.), and D-400 (1-n eq.) are added to a 3-neck round-bottomed flask. The round-bottomed flask is placed in the heating mantle along with an overhead stirrer fitted with an appropriate adapter, a nitrogen inlet, and a septum pierced with a 16 gauge needle. The reaction vessel is purged with dry nitrogen for 10 minutes. The reaction is then heated to 90° C. while stirring at 300 revolutions per minute. Heat is increased in 10° C. increments whenever the reaction solidified, until reaching 130° C. The reaction contents are then cooled to room temperature (about 25° C.). The round-bottomed flask is then inverted over a polytetrafluoroethylene tray and heated to 150° C. for 1 hour. Analysis is performed on the resulting film.

FIG. 1 depicts a summary of the synthesis of linear poly(diketoenamine) copolymers utilizing the difunctional triketone monomer, m-BAPS, and Jeffamine D-400, in this Example 5.

Example 6: Improved Synthesis of Linear Thermoplastic Poly(diketoenamine) Copolymers A temperature controller with a thermocouple is connected to a suitably sized heating mantle. The triketone monomer of Example 4 (1 eq.), m-BAPS (n eq.), and D-400 (1-n eq.) are added to a 3-neck round-bottomed flask. The round-bottomed flask is placed in the heating mantle along with an overhead stirrer fitted with an appropriate adapter, a nitrogen inlet, and a septum pierced with a 16 gauge needle. The reaction vessel is purged with dry nitrogen for 10 minutes. The reaction is then heated to 90° C. while stirring at 300 revolutions per minute. Heat is increased in 10° C. increments whenever the reaction solidified, until reaching 130° C. The reaction is held at 130° C. overnight (approximately 20 h). The reaction contents are then cooled to room temperature (about 25° C.). The round-bottomed flask is then inverted over a polytetrafluoroethylene tray and heated to 150° C. for 1 hour. Analysis is performed on the resulting film.

Example 7: Physical Properties of Thermoplastic Copolymer Films

Four distinct polymer films are synthesized using amines ranging from 100% D-400 to 25% D-400/75% m-BAPS (molar percentages), resulting in varying physical properties. Films are analyzed by DSC, TGA, and rheology to determine Ta5%, $T_g$, and viscosity.

Figure 2A:
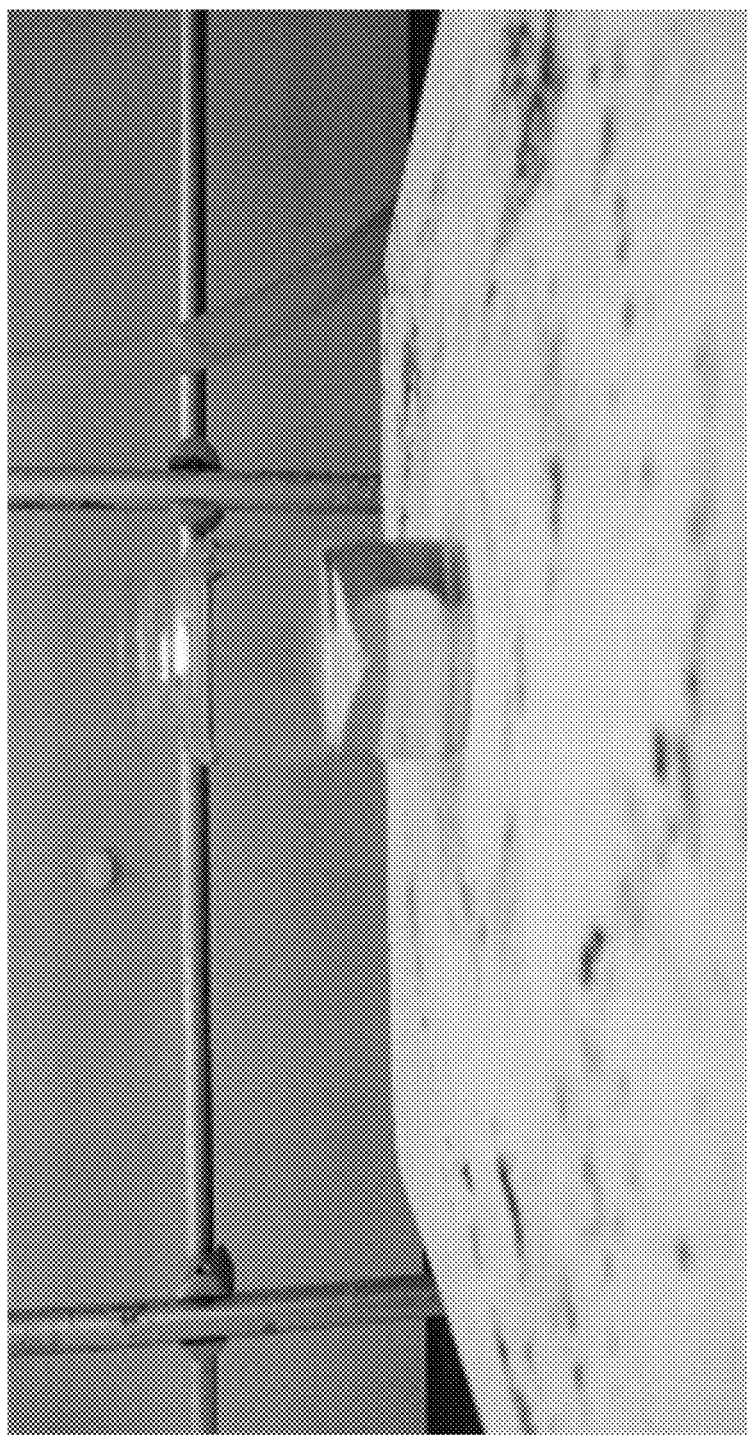
FIG. 2A is a time-lapse photographic images of the depolymerization of linear thermoplastic poly(diketoenamine) copolymer in 6 M HCl in $H_2O$, at time 0, in Example 7.
Figure 2B:
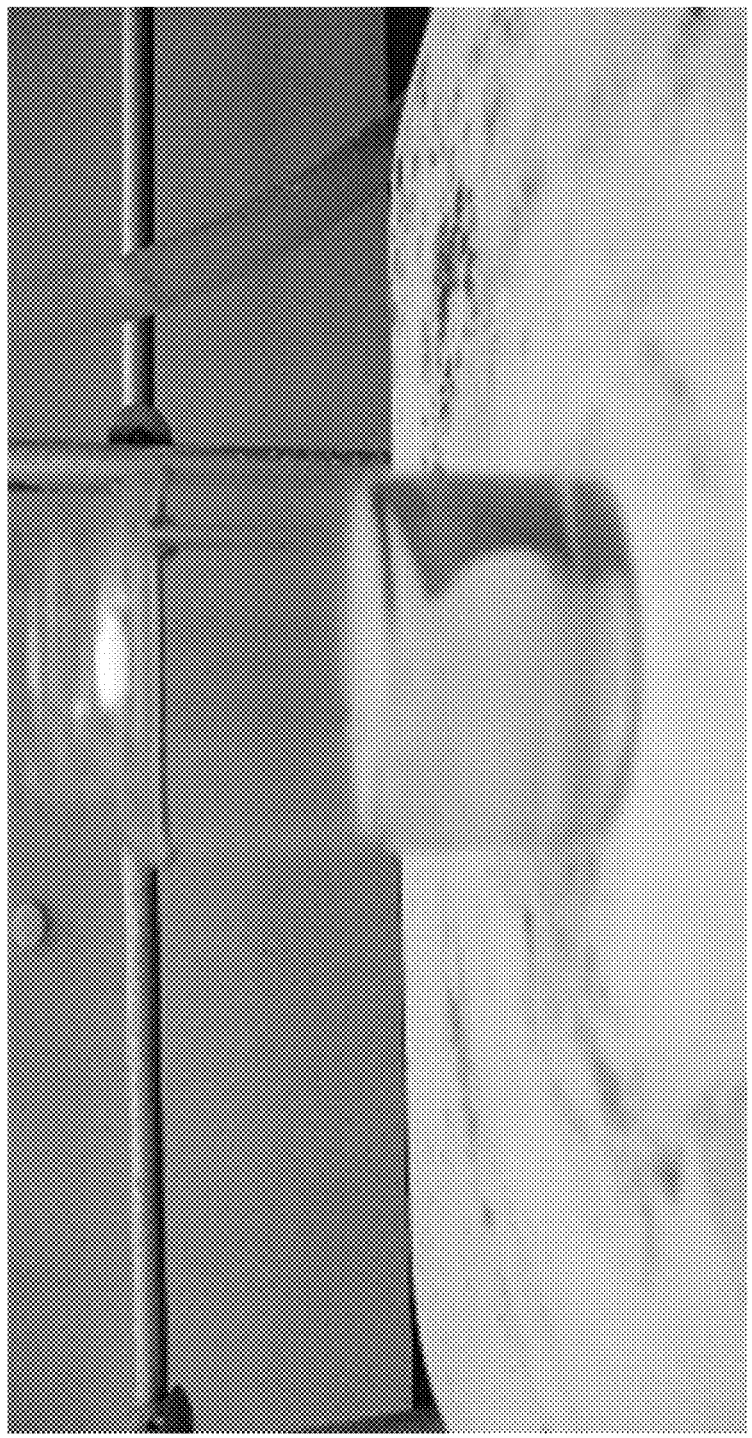
FIG. 2B is a time-lapse photographic images of the depolymerization of linear thermoplastic poly(diketoenamine) copolymer in 6 M HCl in $H_2O$, after 10 minutes, in Example 7.
Figure 2C:
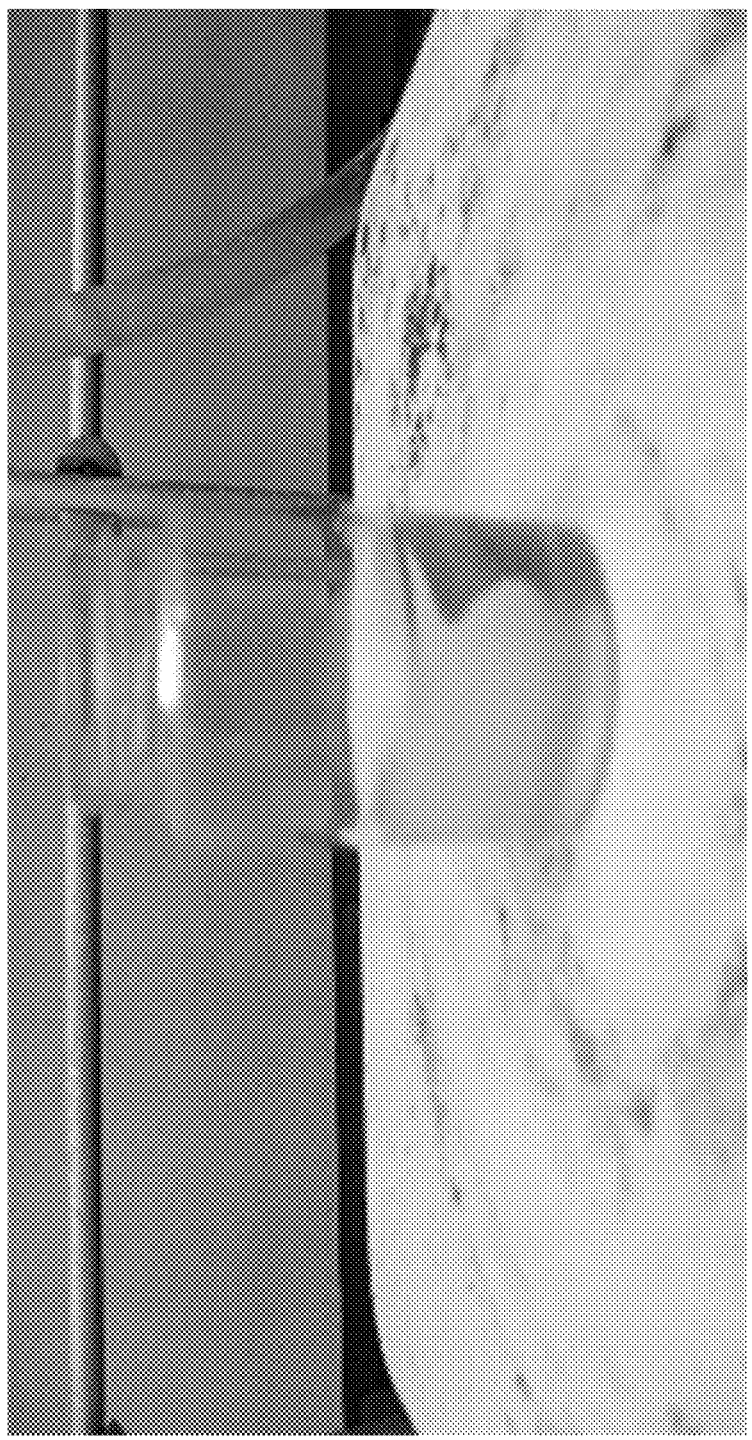
FIG. 2C is a time-lapse photographic images of the depolymerization of linear thermoplastic poly(diketoenamine) copolymer in 6 M HCl in $H_2O$, after 30 minutes, in Example 7.
Figure 2D:
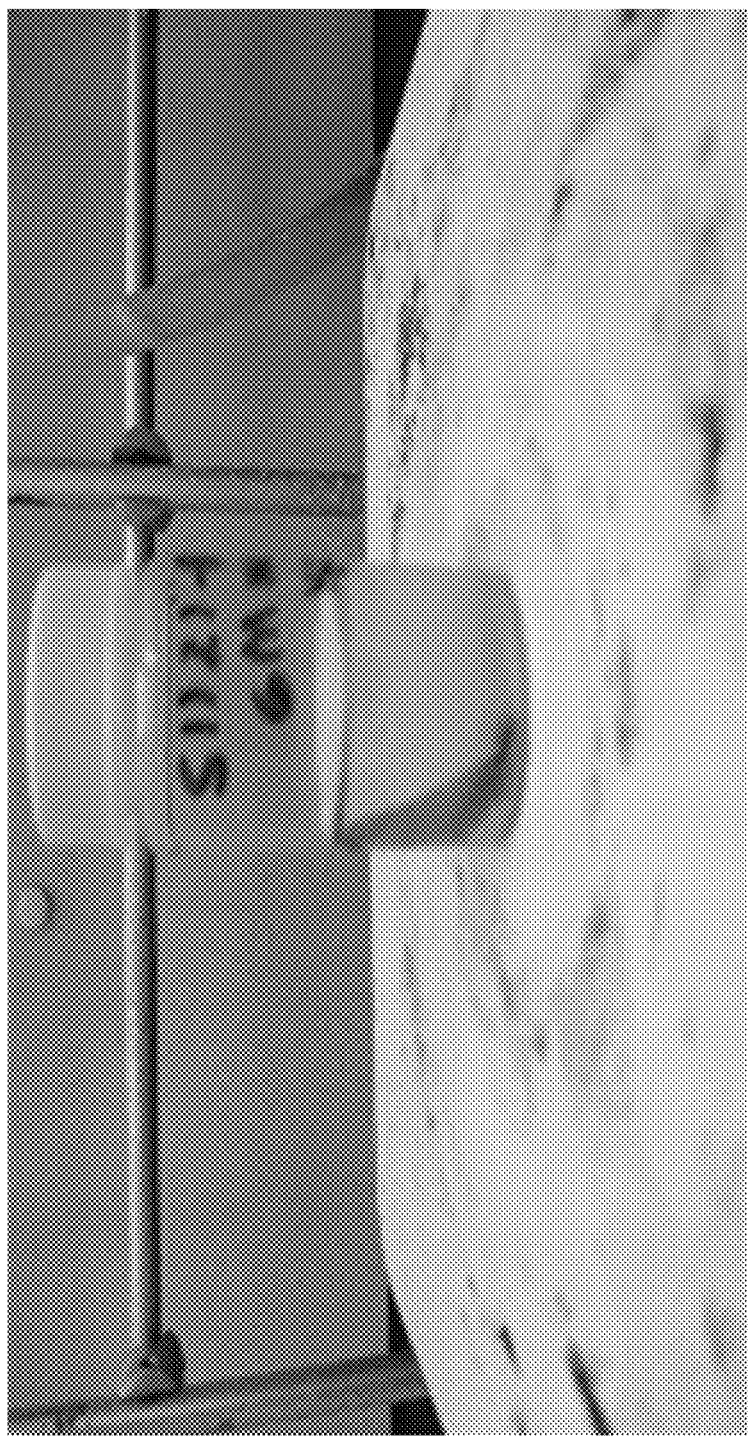
FIG. 2D is a time-lapse photographic images of the depolymerization of linear thermoplastic poly(diketoenamine) copolymer in 6 M HCl in $H_2O$, after 60 minutes, in Example 7.
Figure 3A:
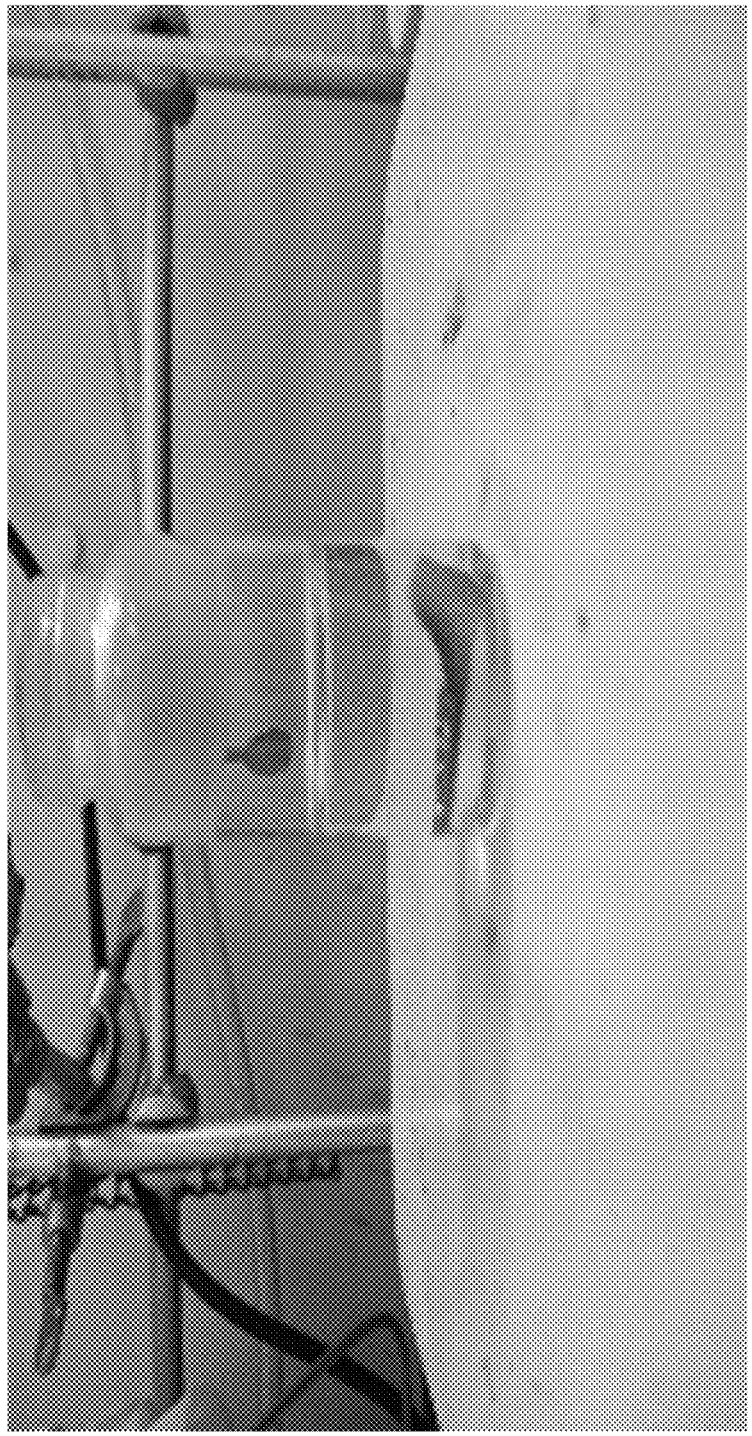
FIG. 3A is a time-lapse photographic images of the depolymerization of linear thermoplastic poly(diketoenamine) copolymer in 6 M HCl in THF, at time 0, in Example 7.
Figure 3B:
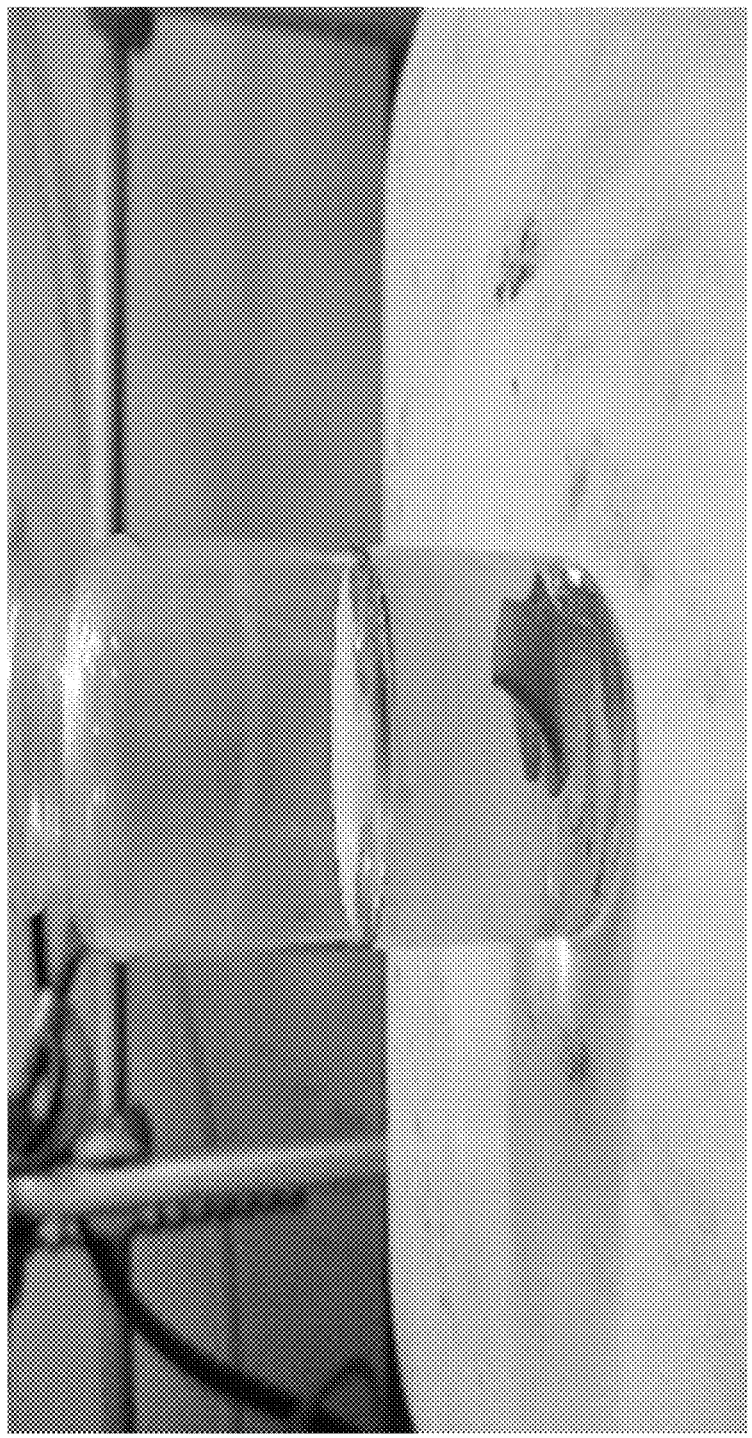
FIG. 3B is a time-lapse photographic images of the depolymerization of linear thermoplastic poly(diketoenamine) copolymer in 6 M HCl in THF, after 10 minutes, in Example 7.
Figure 3C:
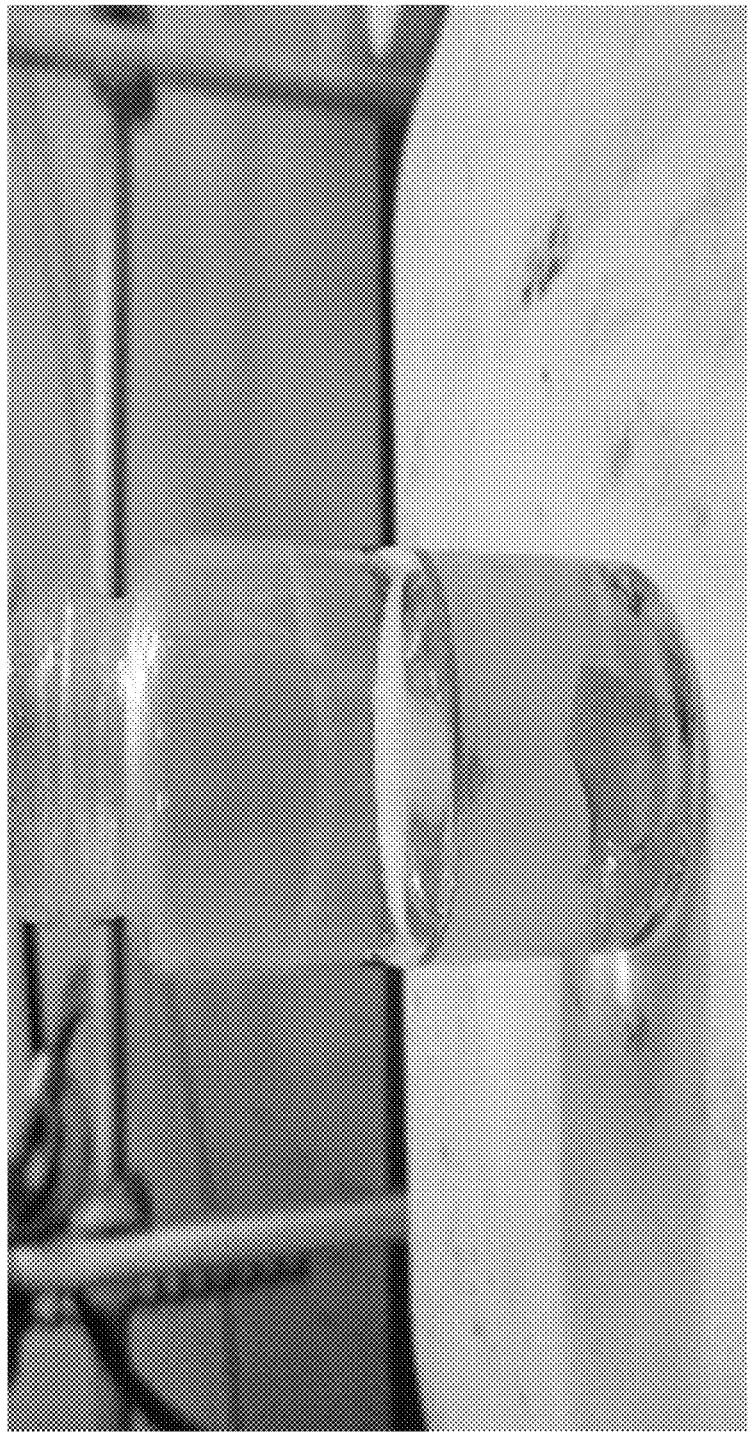
FIG. 3C is a time-lapse photographic images of the depolymerization of linear thermoplastic poly(diketoenamine) copolymer in 6 M HCl in THF, after 30 minutes, in Example 7.
Figure 3D:
FIG. 3D is a time-lapse photographic images of the depolymerization of linear thermoplastic poly(diketoenamine) copolymer in 6 M HCl in THE, after 60 minutes, in Example 7.

FIGS. 2A, 2B, 2C, 2D, 3A, 3B, 3C, and 3D show time-lapse photographic images of the depolymerization of linear thermoplastic poly(diketoenamine) copolymers, in 6 M HCl/H$_2$O compared to 6 M HCl/THF. The figures are as follows:

FIG. 2A: time 0, copolymer in 6 M HCl in H$_2$O
FIG. 2B: 10 minutes, copolymer in 6 M HCl in H$_2$O
FIG. 2C: 30 minutes, copolymer in 6 M HCl in H$_2$O
FIG. 2D: 60 minutes, copolymer in 6 M HCl in H$_2$O
FIG. 3A: time 0, copolymer in 6 M HCl in THE
FIG. 3B: 10 minutes, copolymer in 6 M HCl in THF
FIG. 3C: 30 minutes, copolymer in 6 M HCl in THF
FIG. 3D: 60 minutes, copolymer in 6 M HCl in THF According to these photographs, when using 6 M HCl in THE, nearly all of the poly(diketoenamine) copolymer is depolymerized at room temperature within 30 minutes, which is remarkably rapid. Also of note is the specificity of the depolymerization, in which a mixture of acid and organic solvent assists the depolymerization more efficiently compared to pure aqueous acid. This enables a more chemically robust material for environmental use conditions.

FIG. 4 summarizes thermal analysis data for four distinct poly(diketoenamine) films using the procedure from Example 5 and using amines ranging from 100% D-400 to 25% D-400/75% m-BAPS (molar percentages). The table in FIG. 4 shows $T_g$ and Td5%. ND signifies that data has not been collected.

Figure 5:
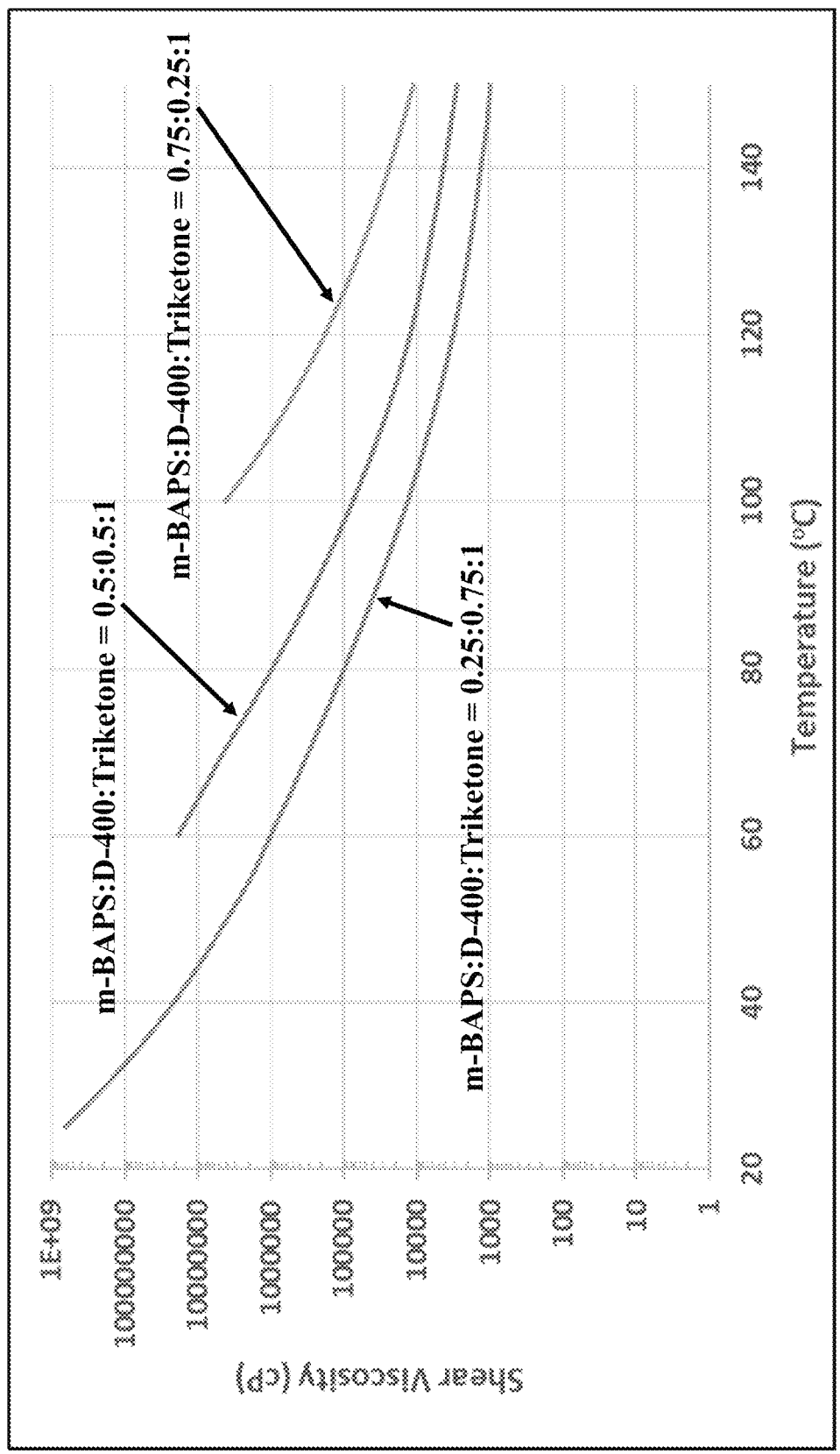
FIG. 5 shows a plot of shear viscosity as a function of temperature for three poly(diketoenamine) copolymer films containing m-BAPS and D400 polyetheramine, in Example 7.

FIG. 5 shows a plot of shear viscosity as a function of temperature for three poly(diketoenamine) copolymer films using the procedure from Example 5 and containing m-BAPS and D400.

Poly(diketoenamine) copolymers using the procedure from Example 5 utilizing a 50:50 composition of m-BAPS to D-400 exhibits a $T_g$ of about 21° C., which is near room temperature. Higher m-BAPS inclusion results in higher $T_g$, and higher D-400 inclusion results in a lower $T_g$, demonstrating tunable properties.

FIG. 6 summarizes thermal analysis data for four distinct poly(diketoenamine) films using the procedure from Example 6 and using amines ranging from 100% D-400 to 25% D-400/75% m-BAPS (molar percentages). The table in FIG. 6 shows $T_g$.

Figure 7:
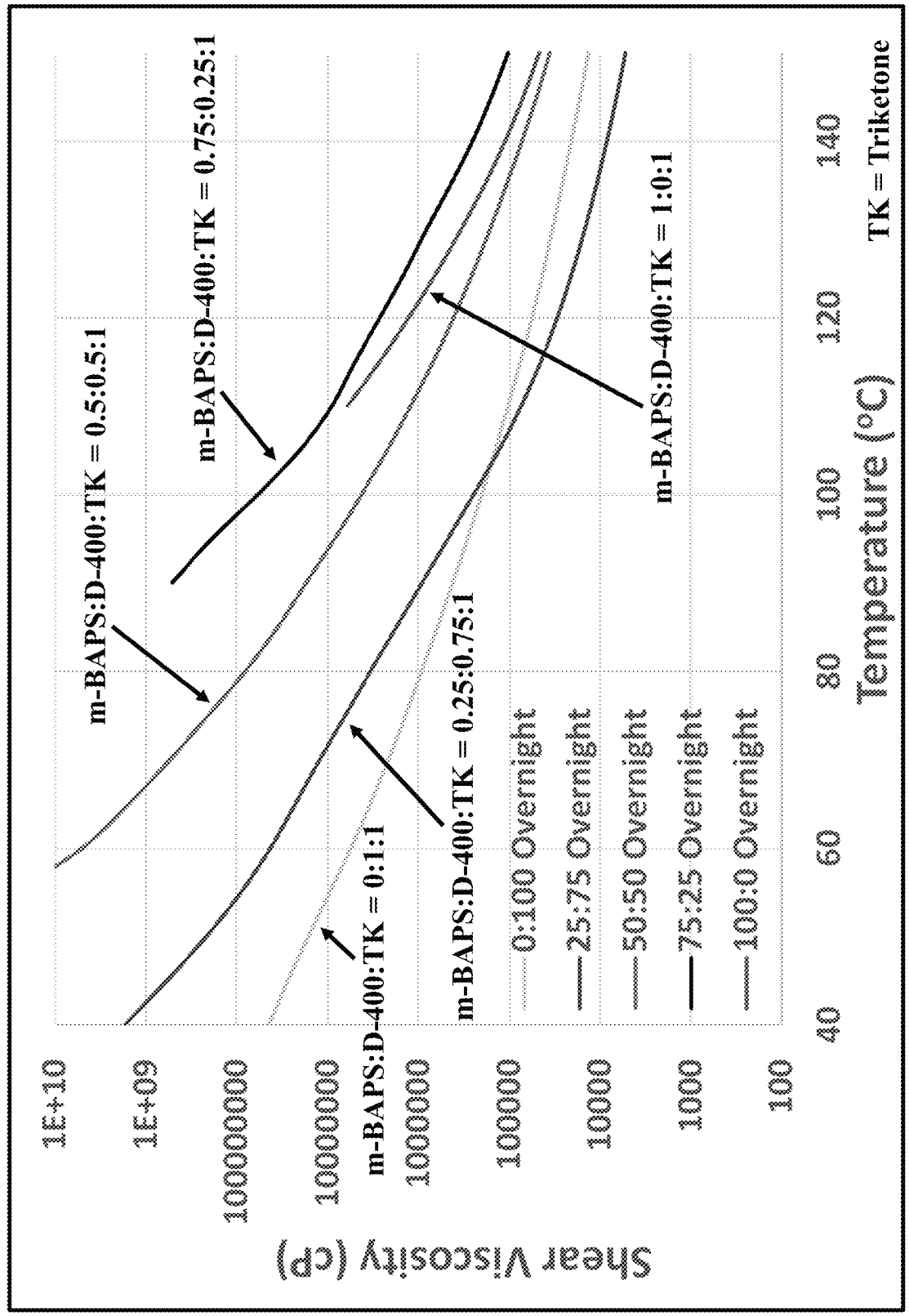
FIG. 7 shows a plot of shear viscosity as a function of temperature for three poly(diketoenamine) copolymer films containing m-BAPS and D400 polyetheramine, in Example 6.

FIG. 7 shows a plot of shear viscosity as a function of temperature for five poly(diketoenamine) copolymer films using the procedure from Example 6 and containing m-BAPS and D400.

Poly(diketoenamine) copolymers using the procedure from Example 6 utilizing a 50:50 molar composition of m-BAPS to D-400 exhibits a $T_g$ of about 29° C. Higher m-BAPS inclusion results in higher $T_g$, and higher D-400 inclusion results in a lower $T_g$, demonstrating tunable properties.

The poly(diketoenamine) copolymers films are able to be recast multiple times by heating above the dynamic bond-exchange temperature, allowing for healing of damage to films.

In this detailed description, reference has been made to multiple embodiments and to the accompanying figures in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A segmented thermoplastic copolymer comprising:
   (a) a plurality of difunctional triketone species, or a reacted form thereof;
   (b) a plurality of a first diamine species, or a reacted form thereof, wherein said first diamine species contains one or more primary amine groups and/or one or more secondary amine groups, and wherein said first diamine species does not contain a tertiary amine group;
   (c) a plurality of a second diamine species, or a reacted form thereof, wherein said second diamine species contains one or more primary amine groups and/or one or more secondary amine groups, wherein said second diamine species does not contain a tertiary amine group, and wherein said second diamine species is different than said first diamine species; and
   (d) a plurality of monofunctional amine-reactive groups, or a reacted form thereof.

2. The segmented thermoplastic copolymer of claim 1, wherein said difunctional triketone species contains a polyether or siloxane.

3. The segmented thermoplastic copolymer of claim 2, wherein said polyether or siloxane is selected from the group consisting of polyethylene glycol, polypropylene glycol, polytetrahydrofuran, polypropanediols, perfluoropolyethers, siloxanes, and combinations thereof.

4. The segmented thermoplastic copolymer of claim 1, wherein said difunctional triketone species has the structure:

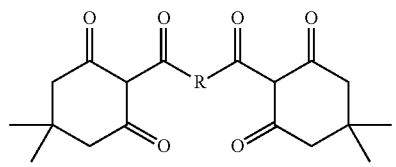

wherein R contains from 1 to 50 carbon atoms;
wherein R is a linear hydrocarbon group, a branched hydrocarbon group, a cyclic hydrocarbon group, or a combination thereof; and
wherein R contains carbon-carbon single bonds, carbon-carbon aromatic bonds, carbon-carbon double bonds, carbon-carbon triple bonds, or a combination thereof.

5. The segmented thermoplastic copolymer of claim 4, wherein said R is a linear hydrocarbon group, and wherein R contains from 4 to 12 carbon atoms.

6. The segmented thermoplastic copolymer of claim 4, wherein said R is selected from benzene, naphthalene, or anthracene.

7. The segmented thermoplastic copolymer of claim 1, wherein said first diamine species and said second diamine species are independently selected from the group consisting of an aliphatic diamine, an aromatic diamine, siloxane diamine, an ether diamine, and combinations thereof.

8. The segmented thermoplastic copolymer of claim 7, wherein said aliphatic diamine is selected from the group consisting of ethylene diamine, 1,2-diaminopropane, 1,3-diaminopropane, 1,2-cyclohexanediamine, 1,3-cyclohexanediamine, 1,4-cyclohexanediamine, and combinations thereof.

9. The segmented thermoplastic copolymer of claim 7, wherein said aromatic diamine is selected from the group consisting of bis[4-(3-aminophenoxy)phenyl]sulfone, poly(bis[4-(3-aminophenoxy)phenyl]sulfone), bis[4-(4-aminophenoxy)phenyl]sulfone, poly(bis[4-(4-aminophenoxy)phenyl]sulfone), benzene diamines, anthracene diamines, naphthalene diamines, 4,4'-diaminodiphenylmethane, 2,3-diaminophenol, 4,4'-oxydianiline, and combinations thereof.

10. The segmented thermoplastic copolymer of claim 7, wherein said ether diamine or siloxane diamine is selected from the group consisting of polyethylene glycol diamine, polypropylene glycol diamine, polytetrahydrofuran diamine, polypropanediol diamines, perfluoropolyether diamines, siloxane diamines, 4,4'-oxydianiline, and combinations thereof.

11. The segmented thermoplastic copolymer of claim 1, wherein said monofunctional amine-reactive groups are selected from the group consisting of epoxy, oxalate, and isocyanate.

12. The segmented thermoplastic copolymer of claim 1, wherein said segmented thermoplastic copolymer further contains one or more additives or fillers.

13. The segmented thermoplastic copolymer of claim 1, wherein said segmented thermoplastic copolymer is characterized by a glass-transition temperature from about −30° C. to about 100° C.

* * * * *